United States Patent
Liu

(10) Patent No.: US 12,056,156 B2
(45) Date of Patent: Aug. 6, 2024

(54) BLOCK-CHAIN-BASED DATA PROCESSING

(71) Applicant: Tencent Technology (Shenzhen) Company Limited, Guangdong (CN)

(72) Inventor: Pan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/300,191

(22) Filed: Apr. 13, 2023

(65) Prior Publication Data
US 2023/0259526 A1  Aug. 17, 2023

Related U.S. Application Data

(63) Continuation of application No. PCT/CN2022/099782, filed on Jun. 20, 2022.

(30) Foreign Application Priority Data

Aug. 4, 2021 (CN) .......................... 202110890413.1

(51) Int. Cl.
- G06F 16/27 (2019.01)
- G06F 11/07 (2006.01)
- G06F 16/23 (2019.01)

(52) U.S. Cl.
CPC .......... G06F 16/27 (2019.01); G06F 11/0787 (2013.01); G06F 16/2365 (2019.01)

(58) Field of Classification Search
CPC .............................. G06F 16/27; G06F 16/2365
See application file for complete search history.

(56) References Cited

U.S. PATENT DOCUMENTS

| 5,724,581 A * | 3/1998 | Kozakura | G06F 11/1448 |
| | | | 714/E11.13 |
| 2019/0303221 A1* | 10/2019 | Masputra | G06F 16/2228 |

FOREIGN PATENT DOCUMENTS

| CN | 109165229 A | 1/2019 |
| CN | 109636388 A | 4/2019 |

(Continued)

OTHER PUBLICATIONS

International Search Report in PCT/CN2022/099782, mailed Sep. 14, 2022, 5 pages.

(Continued)

*Primary Examiner* — Baoquoc N To
(74) *Attorney, Agent, or Firm* — ARENTFOX SCHIFF LLP

(57) ABSTRACT

A plurality of to-be-bookkept data sets associated with one or more blocks from a block file is acquired. Data writing operations are performed in parallel on a plurality of data storage components according to the plurality of to-be-bookkept data sets. A data storage result corresponding to each of the plurality of data storage components is acquired. Based on a data storage failure result being included in the data storage results, a block checkpoint corresponding to the block file is acquired. A component checkpoint corresponding to each of the plurality of data storage components is acquired. A data storage component of the plurality of data storage components is determined, which is in an abnormal component status according to the block checkpoint and the component checkpoints. A data writing operation is performed on the data storage component in the abnormal component status according to the block file.

20 Claims, 8 Drawing Sheets

(56) References Cited

FOREIGN PATENT DOCUMENTS

| | | |
|---|---|---|
| CN | 112291372 A | 1/2021 |
| CN | 112632080 A | 4/2021 |
| CN | 113326165 A | 8/2021 |

OTHER PUBLICATIONS

Written Opinion in PCT/CN2022/099782, mailed Sep. 14, 2022, 5 pages.

* cited by examiner

BLOCK-CHAIN-BASED DATA PROCESSING

RELATED APPLICATIONS

The present application is a continuation of International Application No., PCT/CN2022/099782, entitled "BLOCK-CHAIN-BASED DATA PROCESSING METHOD, DEVICE AND COMPUTER-READABLE STORAGE MEDIUM" and filed on Jun. 20, 2022, which claims priority to Chinese Patent Application No. 202110890413.1, entitled "BLOCKCHAIN-BASED DATA PROCESSING METHOD, DEVICE AND COMPUTER-READABLE STORAGE MEDIUM" and filed on Aug. 4, 2021. The entire disclosures of the prior applications are hereby incorporated by reference in their entirety.

FIELD OF THE TECHNOLOGY

This disclosure relates to networks, including a blockchain-based data processing method, a device for processing the blockchain-based data, and/or a non-transitory computer-readable storage medium associated with the blockchain-based data processing.

BACKGROUND OF THE DISCLOSURE

After a block chain network reaches a consensus on a block, block chain nodes need to write the block and information associated with the block into a ledger. In a related node bookkeeping method, the block and the information associated with the block are written into the ledger in series (including disk and distributed memory). For example, firstly a block header in the block that has passed the consensus is written into the disk or distributed memory. After this step is completed, a transaction list and a transaction execution result set are continuously written into the disk or distributed memory respectively. After the transaction list and the transaction execution result set are written, a write set is written into the disk or distributed memory. After the write set is written, node bookkeeping is completed and a next round of consensus on a block is started. At present, there may not only be a defect of poor performance in the processing of block bookkeeping, but also a large delay in each round of block bookkeeping.

SUMMARY

Embodiments of this disclosure provide a blockchain-based data processing method, a device and a non-transitory computer-readable storage medium.

According to an aspect of the disclosure, a method of blockchain-based data processing is provided. In the method, a plurality of to-be-bookkept data sets associated with one or more blocks from a block file are acquired. Each of the plurality of to-be-bookkept data sets has a respective date class. Data writing operations are performed in parallel on a plurality of data storage components according to the plurality of to-be-bookkept data sets. A data storage result corresponding to each of the plurality of data storage components is acquired. A number of the data storage components is equal to a number of the to-be-bookkept data sets. Each of the data storage components is configured to store a respective one of the plurality of to-be-bookkept data sets. Based on a data storage failure result being included in the data storage results, a block checkpoint corresponding to the block file is acquired. Further, a component checkpoint corresponding to each of the plurality of data storage components is acquired. The block checkpoint is a maximum block height in the block file. Each of the component checkpoints indicates a maximum block height corresponding to a respective one of the plurality of data storage components. A data storage component of the plurality of data storage components is determined. The date storage component is in an abnormal component status according to the block checkpoint and the component checkpoints. A data writing operation is performed on the data storage component in the abnormal component status according to the block file.

According to another aspect of the disclosure, an apparatus is provided. The apparatus includes processing circuitry. The processing circuitry can be configured to perform any of the described methods for blockchain-based data processing.

Aspects of the disclosure also provide a non-transitory computer-readable medium storing instructions which when executed by a computer for video decoding cause the computer to perform any of the described methods for blockchain-based data processing.

Details of one or more embodiments of this disclosure will be provided in the following drawings and descriptions. Other features, purposes and advantages of this disclosure will become apparent from the description, drawings and claims.

BRIEF DESCRIPTION OF THE DRAWINGS

In order to more clearly describe the embodiments of this disclosure, the following will briefly introduce the drawings.

DESCRIPTION OF EMBODIMENTS

Figure 1:
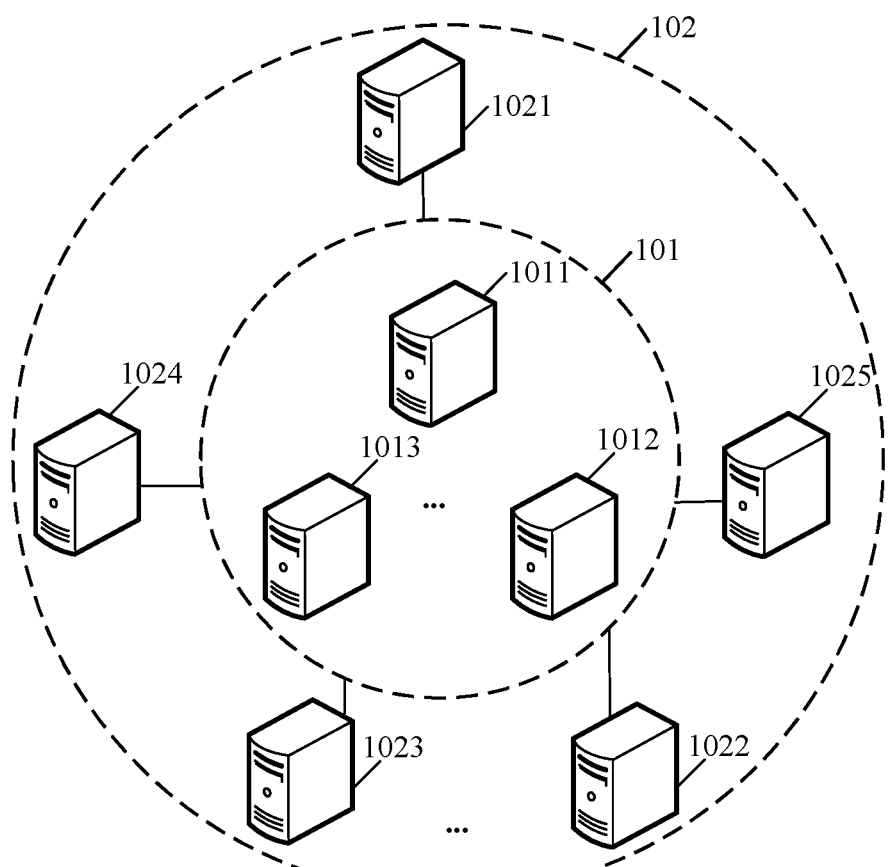
FIG. 1 is a schematic diagram of a system architecture according to an embodiment of this disclosure.

The technical solutions in the embodiments of this disclosure will be described in the following with reference to the accompanying drawings in the embodiments of this disclosure. The described embodiments are merely some rather than all of the embodiments of this disclosure. Other embodiments are within the scope of protection of this disclosure.

In order to facilitate understanding, first of all, some norms will be briefly explained below.

Block chain may include a chained data structure in a basic unit of block. In blocks, digital digests are used for verifying previously acquired transaction history, which is suitable for tamper-proof and scalability requirements in distributed bookkeeping scenarios; in a broad sense, block chain also refers to a distributed bookkeeping technology realized by a block chain structure, including distributed consensus, privacy and security protection, peer-to-peer communication technology, network protocol, smart contract, etc. The goal of block chain is to achieve a distributed data record ledger, which allows addition and does not allow deletion. The basic structure of the bottom layer of the ledger is a linear linked list. The linked list is composed of "blocks" in series. The hash of the predecessor block is recorded in the subsequent block. Whether each block (and the transaction in the block) is legal can be quickly checked by calculating the hash. If a node in the network proposes to add a new block, the block has to be confirmed by consensus through a consensus mechanism.

Block may include a data packet that carries transaction data on the block chain network and is a data structure marked with a timestamp and the hash corresponding to the predecessor block. The transaction in the block is verified and confirmed through the consensus mechanism of the network. A block includes a block header and a block body. The block header can record the meta information of the current block, including the current version number, the hash corresponding to the predecessor block, the timestamp, the random number, the hash of the Merkle Root, and other data. The block body can record the detailed data generated within a period of time, including all verified transaction records or other information generated for the current block in the block creation process, which can be understood as a manifestation of the ledger. In addition, the detailed data of the block body may include a unique Merkle Root generated through the hash process of Merkle Tree, which is recorded in the block header. The predecessor block, also known as the parent block, is sorted in time by recording the hash corresponding to the block and the hash corresponding to the parent block in the block header.

Hash may include information eigenvalue or eigenvalue. Hash may be generated by converting input data of any length into a password through a hash algorithm and performing fixed output. The original input data cannot be retrieved by decrypting the hash. It is a one-way encryption function. In the block chain, each block (except the initial block) contains the hash of the predecessor block. The hash is an important aspect of the potential of the block chain technology. It preserves the authenticity of the recorded and viewed data and the integrity of the block chain as a whole.

Smart contract may include a computer protocol designed to disseminate, verify or execute contracts in an information-based manner. In the block chain system, a smart contract (contract for short) may include a code that can be understood and executed by each node of the block chain, which can execute arbitrary logic and get results. In actual application, smart contracts can be managed and tried through transactions on the block chain. Each transaction is equivalent to a Remote Procedure Call (RPC) request to the block chain system. If a smart contract is equivalent to an executable program, a block chain is equivalent to an operating system that provides a running environment. A block chain may contain a plurality of contracts, which are distinguished by identity (ID), identification number or name.

In an example of Contract execution, by initiating a transaction, users can call the deployed contracts on the block chain. Each node in the block chain system runs the same contract. For contracts that need to read data, the node's own ledger will be accessed. Finally, all nodes mutually verify whether the execution results are consistent (consensus). In a case that the execution results are consistent, all nodes store necessary results in their own ledgers and return the results to the users.

Read-write set may include the operation record of node ledger data during contract execution. It may be divided into read set and write set, which refer to the data read from the ledger and the data to be written into the ledger when the smart contract is executed.

In an example of a block chain node, the block chain network divides nodes into consensus nodes (also called core nodes) and synchronization nodes (including data nodes and light nodes). The consensus nodes are responsible for the consensus business of the block chain network. The synchronization nodes are responsible for synchronizing the ledger information of the consensus nodes, that is, synchronizing the latest block data. The internal structure of both consensus nodes and synchronization nodes includes network communication components, because the block chain network is essentially a peer-to-peer (P2P) network, which needs to communicate with other nodes in the block chain network through P2P components. The resources and services in the block chain network are distributed on each node. The transmission of information and the realization of services are directly performed between nodes, without requiring the intervention of intermediate links or centralized servers (third parties).

FIG. 1 is a schematic diagram of a system architecture according to an embodiment of this disclosure. Referring to FIG. 1, the system architecture may be a block chain network. The block chain network may include a consensus network 101 and a synchronization network 102. Nodes in the synchronization network 102 may be called synchronization nodes. The synchronization nodes mainly perform business execution, do not participate in bookkeeping consensus, and obtain block data and the like from the consensus network 101 through identity authentication. The consensus network 101 may also be called the core network. The nodes in the consensus network 101 may be called consensus nodes. The consensus nodes have full data. The consensus network 101 and the synchronization network 102 may be in different network environments. In an example, the consensus network 101 is in a private network, while the synchronization network 102 is in a public network. The two interact through routing boundaries. Also refer to FIG. 1. The consensus network 101 may include a consensus node 1011, a consensus node 1012, . . . , a consensus node 1013. It is to be understood that the consensus network 101 may include one or more consensus nodes. The number of the consensus nodes is not limited here. Also refer to FIG. 1. The synchronization network 102 may include a synchronization node 1021, a synchronization node 1022, a synchronization node 1023, . . . , a synchronization node 1024 and a synchronization node 1025. It is to be understood that the synchronization network 102 may include one or more synchronization nodes. The number of the synchronization nodes is not limited here.

Each node (including the consensus nodes in the consensus network 101 and the synchronization nodes in the synchronization network 102) may receive the transaction data (equivalent to the transaction information) transmitted by the client during normal operation, generate a block based on the received transaction data, and then perform block chaining processing. In order to ensure the data exchange between all nodes, data connections may exist between all nodes, such as data connection between the consensus node 1011 and the consensus node 1012, data connection between the consensus node 1011 and the consensus node 1013, and data connection between the synchronization node 1021 and the synchronization node 1023. Further, data connections may exist between the consensus network 101 and the synchronization network 102, such as data connection between the consensus node 1011 and the synchronization node 1022, and data connection between the consensus node 1012 and the synchronization node 1023.

It is to be understood that data or block transmission may be performed between nodes through the data connections. The data connections between the nodes may be based on the node identity. Each node in the block chain network has its corresponding node identity, and each node may store the node identities of other nodes connected with itself, so that the acquired data or generated blocks can be broadcast to other nodes according to the node identities of other nodes. For example, the consensus node 1011 may maintain a node identity list, which stores the node names and node identities of other nodes, as shown in Table 1.

TABLE 1

Node names and node identities corresponding to the node names

| Node name | Node identity |
|---|---|
| Consensus node 1012 | 117.114.151.174 |
| Consensus node 1013 | 117.116.189.145 |
| ... | ... |
| Synchronization node 1021 | 117.114.151.183 |
| Synchronization node 1022 | 117.116.189.125 |
| Synchronization node 1023 | 119250485362 |
| ... | ... |

The node identity may be the Internet Protocol (IP) address of the interconnection between networks and any other information that can be used for identifying nodes in the block chain network. In Table 1, description is made by taking the IP address as an example. Assuming that the node identity of the consensus node 1011 is 117.116.156.425, the consensus node 1011 may transmit a data synchronization request to the synchronization node 1021 through the node identity 117.114.151.183, and the synchronization node 1021 can know that the data synchronization request is transmitted by the consensus node 1011 through node identity 117.116.156.425. Similarly, the synchronization node 1023 may transmit transaction data A to the consensus node 1011 through the node identity 117.116.156.425, and the consensus node 1011 can know that the transaction data A is transmitted by the synchronization node 1023 through the node identity 119.250.485.362. The data transmission between other nodes is the same. It is to be understood that the data connection method is not limited. They may be directly or indirectly connected through wired communication, or directly or indirectly connected through wireless communication, or through other connection methods, which are not limited in this disclosure. In FIG. 1, the consensus node 1011, the consensus node 1012, . . . , the consensus node 1013, the synchronization node 1021, the synchronization node 1022, the synchronization node 1023, . . . , the synchronization node 1024 and the synchronization node 1025 may include mobile phones, tablets, laptops, hand-held computers, smart speakers, mobile Internet devices (MIDs), Point of Sales (POS) machines, wearable devices (such as smart watches and smart bracelets), etc.

It is to be understood that the blockchain-based data processing method according to the embodiment of this disclosure may be executed by a computer device, including but not limited to a terminal or a server. The server may be an independent physical server, a server cluster or a distributed system composed of a plurality of physical servers, or a cloud server that provides cloud services, cloud databases, cloud computing, cloud functions, cloud storage, network services, cloud communication, middleware services, domain name services, security services, CDN, and basic cloud computing servers for big data and artificial intelligence platforms. The terminal may be, but is not limited to, a smart phone, a tablet, a laptop, a desktop computer, a smart speaker, a smart watch, a car terminal or a smart television. The terminal and the server may be connected directly or indirectly through wired or wireless communication, which is not limited in this disclosure.

Figure 2:
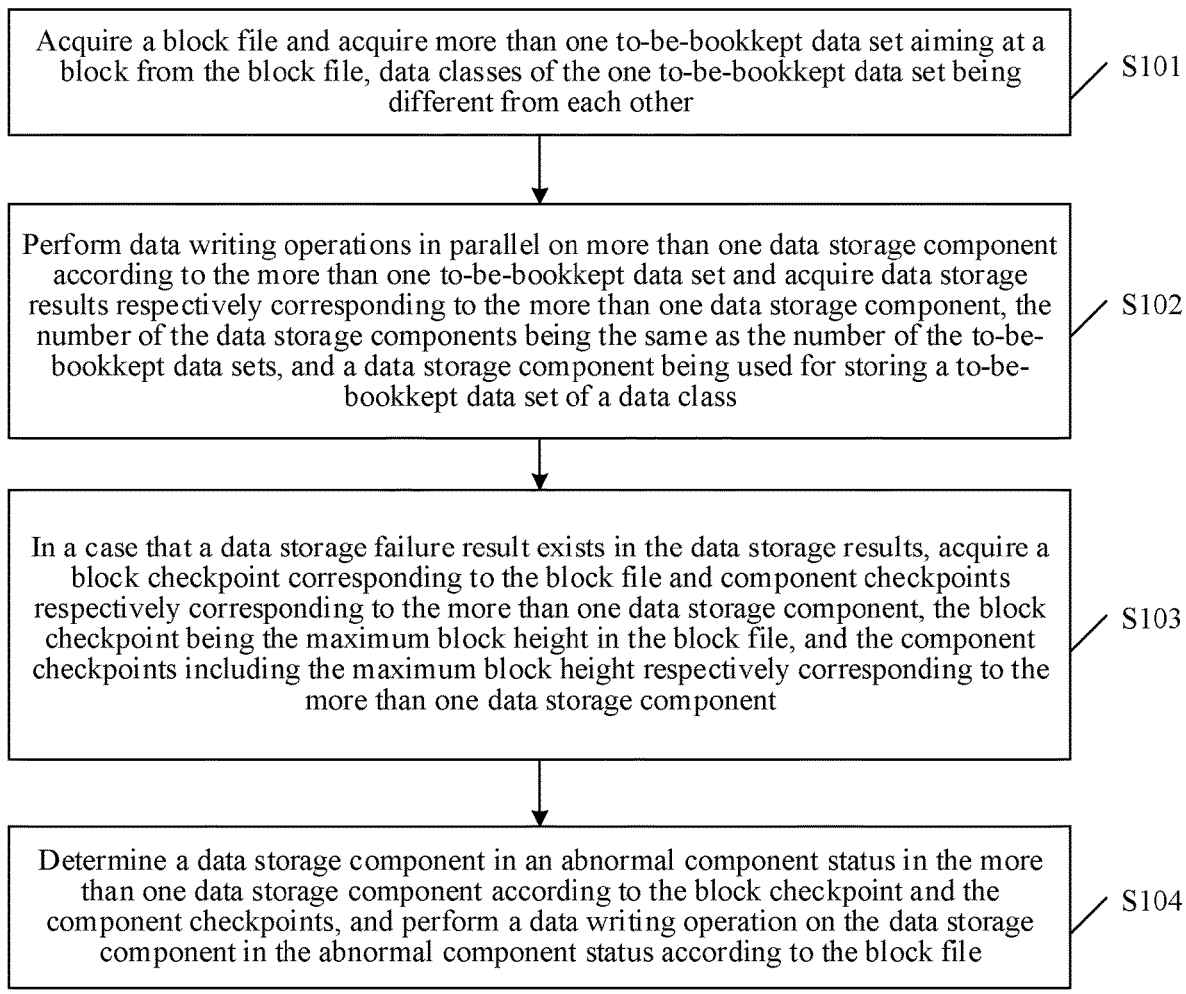
FIG. 2 is a flowchart of a blockchain-based data processing method according to an embodiment of this disclosure.

Further, refer to FIG. 2, which is a flowchart of a blockchain-based data processing method according to an embodiment of this disclosure. The blockchain-based data processing method may be executed by a computer device. The computer device may include any one of consensus nodes in the consensus network 101 in FIG. 1. Referring to FIG. 2, the data processing process may include the following steps:

In step S101, a block file is acquired and more than one to-be-bookkept data set aiming at a block is acquired from the block file. Data classes of the one to-be-bookkept data set are different from each other.

In an example, the number of the to-be-bookkept data sets is more than 1. For example, it may be m, and m is a positive integer greater than 1. Data classes of the to-be-bookkept data sets are different from each other. For example, when m=3, the data classes include a block class, a status class and a read-write class. In an embodiment, the computer device may acquire block data associated with the block class from the block file, and generate a block data set according to the block data; acquire status data associated with the status class from the block file, and generate a status data set according to the status data; acquire read-write data associated with the read-write class from the block file, and generate a read-write data set according to the read-write data; generate m to-be-bookkept data sets according to the block data set, the status data set and the read-write data set. For each data class, an index pair may be constructed based on the data associated with the data class to generate a corresponding to-be-bookkept data set. In this embodiment, by dividing the data classes into the block class, the status class and the read-write class to generate the block data set, the status data set and the read-write data set respectively according to the associated data, and to obtain the to-be-bookkept data set, the to-be-bookkept data can be classified, which is conducive to parallel processing based on different data classes and improves the efficiency of block chain data processing.

In an embodiment, the block data include transaction information and block information, and the block information includes a transaction identity of the transaction information. An index pair may be constructed aiming at the transaction information and the block information to generate a block data set. The specific process of generating a block data set according to the block data may include the following: the computer device uses the transaction identity as a first index key, uses the transaction information as a first index value, and determines the first index key and the first index value as a first index pair; uses the block height corresponding to the block information as a second index key, uses the block information as a second index value, and determines the second index key and the second index value as a second index pair; uses a block identity corresponding to the block information as a third index key, uses the block height corresponding to the block information as a third index value, and determines the third index key and the third index value as a third index pair; generates a block data set according to the first index pair, the second index pair and the third index pair. The block height can be used for describing the position of the corresponding block in the block chain.

In this embodiment, by constructing the first index pair through the transaction identity and the transaction information, constructing the second index pair through the block height corresponding to the block information and the block information, constructing the third index pair through the block identity corresponding to the block information and the block height corresponding to the block information, and generating the block data set according to the first index pair, the second index pair and the third index pair, the block data set including various block information can be obtained, and parallel writing processing can be performed through the block data set, thus improving the network performance of the block chain and reducing the response time of external business.

In an embodiment, the specific process of generating a status data set according to the status data may include the following: the computer device combines a contract identity and an object identity to form a fourth index key, uses the status data as a fourth index value, and determines the fourth index key and the fourth index value as a fourth index pair; acquires a version identity corresponding to historical status data of the object identity, and generates a version identity corresponding to the status data according to the version identity corresponding to the historical status data; uses the status data and the version identity corresponding to the status data as a fifth index key, uses the block height corresponding to the status data as a fifth index value, and determines the fifth index key and the fifth index value as a fifth index pair; generates a status data set according to the fourth index pair and the fifth index pair.

In this embodiment, by constructing the fourth index pair through the contract identity, the object identity and the status data, constructing the fifth index pair through the status data, the version identity corresponding to the status data and the block height corresponding to the status data, and generating the status data set according to the fourth index pair and the fifth index pair, the status data set including various block information can be obtained, and parallel writing processing can be performed through the status data set, thus improving the network performance of the block chain and reducing the response time of external business.

In an embodiment, the read-write data include read data and write data. The specific process of generating a read-write data set according to the read-write data may include the following: the computer device uses a read data identity of the read data as a sixth index key, uses the read data as a sixth index value, and determines the sixth index key and the sixth index value as a sixth index pair; uses a write data identity of the write data as a seventh index key, uses the write data as a seventh index value, and determines the seventh index key and the seventh index value as a seventh index pair; uses the block height corresponding to the read data as an eighth index key, uses the read data identity as an eighth index value, and determines the eighth index key and the eighth index value as an eighth index pair; uses the block height corresponding to the write data as a ninth index key, uses the write data identity as a ninth index value, and determines the ninth index key and the ninth index value as a ninth index pair; generates a read-write data set according to the sixth index pair, the seventh index pair, the eighth index pair and the ninth index pair.

In this embodiment, by constructing the sixth index pair through the read data identity of the read data and the read data, constructing the seventh index pair through the write data identity of the write data and the write data, constructing the eighth index pair through the block height corresponding to the read data and the read data identity, constructing the ninth index pair through the block height corresponding to the write data and the write data, and generating the read-write data set according to the sixth index pair, the seventh index pair, the eighth index pair and the ninth index pair, the read-write data set including various block information can be obtained, and parallel writing processing can be performed through the read-write data set, thus improving the network performance of the block chain and reducing the response time of external business.

Figure 3A:
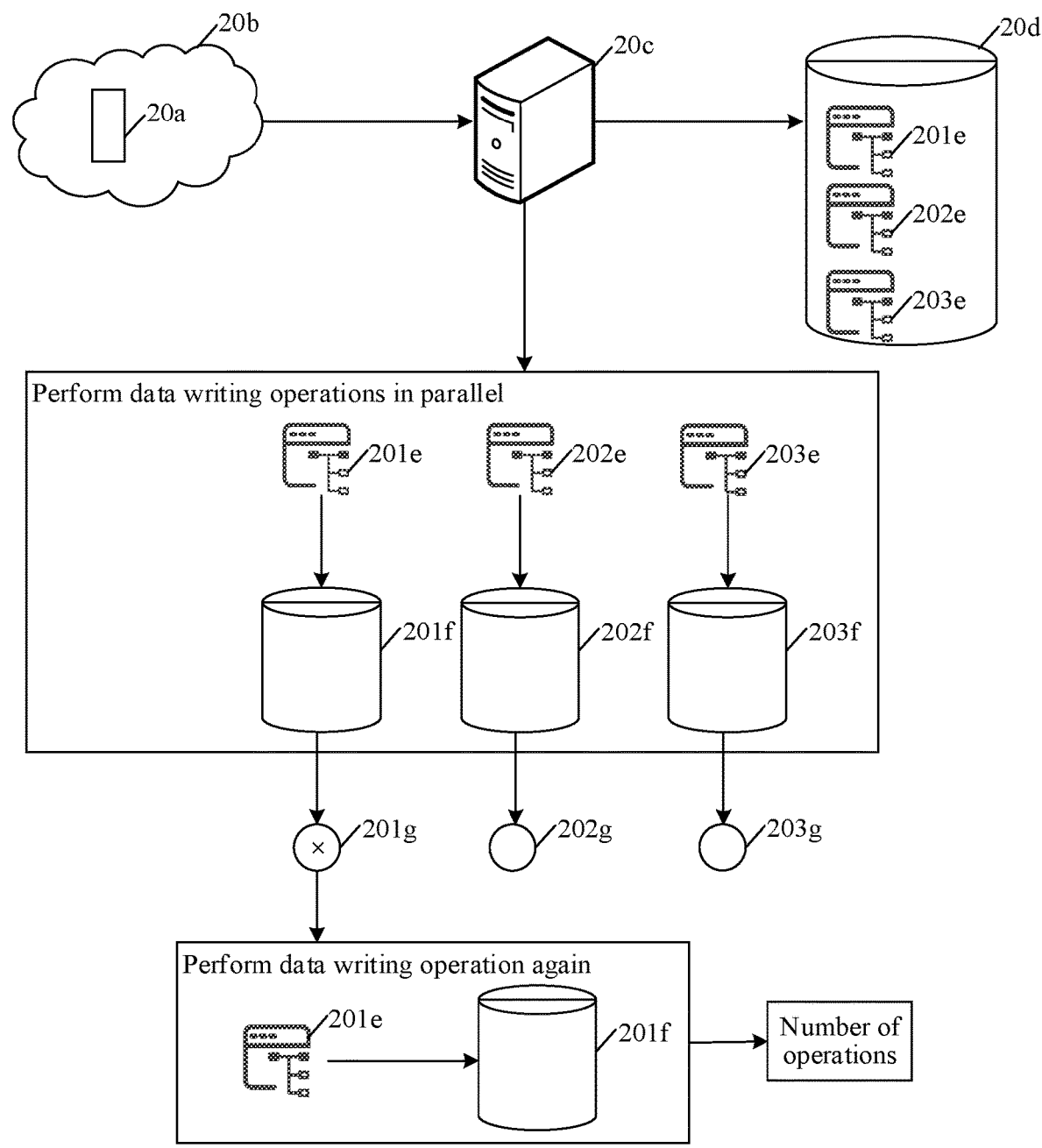
FIG. 3A is a schematic diagram of a scenario of blockchain-based data processing according to an embodiment of this disclosure.

After all blocks in the block chain network have reached a consensus, the consensus nodes in the block chain network need to write the block that has passed the consensus (the block in this case can be understood as a cache block because it has not been written into the ledger) and the data associated with the block (such as execution transaction result set and read-write data set) into the ledger. Jointly refer to FIG. 3A, which is a schematic diagram of a scenario of blockchain-based data processing according to an embodiment of this disclosure. Referring to FIG. 3A, a consensus result of a block $20a$ in the block chain network $20b$ is a consensus pass result, so a consensus node $20c$ may the write block $20a$ to a block file $20d$. The block $20a$ may include one or more blocks. The number of the blocks $20a$ is not limited in the embodiment of this disclosure, and can be set according to the block consensus mode of the block chain network in the actual application. The block file $20d$ can be understood as a database of the consensus node $20c$, is used for storing the block $20a$ and the read-write data and status data of the block $20a$, and can be used for recovery after abnormal interruption in the writing process of the to-be-bookkept data set. In addition, the block file $20a$ records the maximum block height as a block checkpoint. It is to be understood that the maximum block height is generally the maximum block height in the block $20a$. In a case that the consensus network reaches a consensus of passing a new block (the block height of the block is greater than the block height of the block $20a$) while writing the block $20a$ into the ledger, the consensus node $20c$ may firstly not add the new block to the block file $20d$, but add the new block to the block file $20d$ after writing the block $20a$ to a disk or distributed memory. In this case, the block file $20d$ may record the maximum block height in the newly added block as a new block checkpoint. In an exemplary application, in a case that the consensus network reaches a consensus of passing a new block (the block height of the block is greater than the block height of the block $20a$) while writing the block $20a$ into the ledger, the consensus node $20c$ may add the new block to the block file $20d$, the block checkpoint is not updated temporarily, that is, the block checkpoint is the maximum block height in the block $20a$, and the block checkpoint is updated after the block $20a$ is successfully written into the ledger.

In the embodiment of this disclosure, a version identity is added for each status in the ledger. In a case that the contract business of the execution transaction changes a certain status, the version identity of that status may be added by 1, and is mapped to the height of the changed block at the same time, for the purpose of marking that the modification occurs in a certain block. The status can be understood as an object in the ledger, such as user account. The version identity can be customized. The version identity is not limited in the embodiment of this disclosure, which may be any kind of information that can be used for identifying the status.

It is to be understood that the consensus node 20c writes the block 20a into the block file 20d by the relationship of data index, that is, writes the to-be-bookkept data set into the block file 20d according to the data class. The consensus node 20a may also directly write the block 20a into the block file 20d. When the block 20a is written into the ledger, the data in block 20a are classified according to the data class to generate m to-be-bookkept data sets. The generation time of the m to-be-bookkept data sets is not limited in the embodiment of this disclosure, which may be set according to the actual application scenario. The data class is not limited in the embodiment of this disclosure, which may be set according to the actual application scenario. This disclosure is described by taking the block class, the status class and the read-write class as examples. The block class refers to a class corresponding to block data. The block data may include transaction information (i.e., transaction detail data) and block information. The block information includes a transaction identity of the transaction information. The transaction identity may be a hash corresponding to the transaction information. The status class refers to a class corresponding to status data. The status data may include the current record or feature of an object. For example, an object a performs a transaction d based on a contract c at a timestamp b. The form of the status data is not limited in the embodiment of this disclosure, which may be set according to the actual application scenario. The read-write class refers to a class corresponding to read-write data corresponding to the transaction information.

Refer to FIG. 3A again. The embodiment of this disclosure is described by taking m=3 as an example. The consensus node 20c acquires three to-be-bookkept data sets of different data classes aiming at the block 20a from the block file 20d, namely, to-be-bookkept data set 201e, to-be-bookkept data set 202e and to-be-bookkept data set 203e in the example in FIG. 3A. The to-be-bookkept data set 201e may be a block data set of a data class which is the block class. The block data set is a data mapping table. Specifically, it may use the transaction identity as a first index key, use the transaction information as a first index value, and determine the first index key and the first index value as a first index pair; further, use the block height corresponding to the block information as a second index key, use the block information as a second index value, and determine the second index key and the second index value as a second index pair; further, use a block identity (which may be a block hash) corresponding to the block information as a third index key, use the block height corresponding to the block information as a third index value, and determine the third index key and the third index value as a third index pair. The consensus node 20c generates a block data set according to the first index pair, the second index pair and the third index pair.

The to-be-bookkept data set 202e may be a status data set of a data class which is the status class. The status data set is a data mapping table. Specifically, it may combine a contract identity and an object identity to form a fourth index key, use the status data as a fourth index value, and determine the fourth index key and the fourth index value as a fourth index pair, where the contract identity may be any kind of information that can identify the contract, such as contract storage address or contract name; similarly, the object identity may be any kind of information that can identify the object, such as object account; the contract identity and the object identity are not limited in the embodiment of this disclosure; acquire a version identity corresponding to historical status data of the object identity, and generate a version identity corresponding to the status data according to the version identity corresponding to the historical status data; use the status data and the version identity corresponding to the status data as a fifth index key, use the block height corresponding to the status data as a fifth index value, and determine the fifth index key and the fifth index value as a fifth index pair. The consensus node 20c generates a status data set according to the fourth index pair and the fifth index pair.

The to-be-bookkept data set 203e may be a read-write data set of a data class which is the read-write class. The read-write data set is a data mapping table. Specifically, it may use a read data identity of the read data (which may be a hash of the read data) as a sixth index key, use the read data as a sixth index value, and determine the sixth index key and the sixth index value as a sixth index pair; use a write data identity of the write data (which may be a hash of the write data) as a seventh index key, use the write data as a seventh index value, and determine the seventh index key and the seventh index value as a seventh index pair; use the block height corresponding to the read data as an eighth index key, use the read data identity as an eighth index value, and determine the eighth index key and the eighth index value as an eighth index pair; use the block height corresponding to the write data as a ninth index key, use the write data identity as a ninth index value, and determine the ninth index key and the ninth index value as a ninth index pair; generate a read-write data set according to the sixth index pair, the seventh index pair, the eighth index pair and the ninth index pair.

In step S102, data writing operations are performed in parallel on more than one data storage component according to the more than one to-be-bookkept data set and data storage results respectively corresponding to the more than one data storage component are acquired. The number of the data storage components is the same as the number of the to-be-bookkept data sets. A data storage component is used for storing a to-be-bookkept data set of a data class.

For example, a data writing operation is performed for a to-be-bookkept data set through a corresponding data storage component to store the to-be-bookkept data set. During implementation, the data writing operation may be performed on the data storage component by writing instruction to implement the storage processing of the to-be-bookkept data set to obtain a corresponding data storage result. Different data classes correspond to different data storage components, that is, for to-be-bookkept data sets of different data classes, data writing operations are performed respectively through their corresponding data storage components. For example, in a case that the number of the to-be-bookkept data sets is m, the m to-be-bookkept data sets may include a batch to-be-bookkept data set, such as a to-be-bookkept data set $A_b$, the m data storage components include a batch data storage component used for storing the to-be-bookkept data set $A_b$, specifically data storage component $C_b$, b is a positive integer, and b is less than or equal to m.

In an embodiment, the processing process of performing data writing operations in parallel may include the following: the computer device acquires a batch data writing instruction aiming at the batch to-be-bookkept data set, i.e., the to-be-bookkept data set $A_b$; performs a data writing operation on the batch data storage component, i.e., the data storage component $C_b$, according to the batch data writing instruction to write the to-be-bookkept data set $A_b$ to the data storage component $C_b$; performs data writing operations on other data storage components in parallel according to other to-be-bookkept data sets while performing the data writing operation on the data storage component $C_b$. The other to-be-bookkept data sets include to-be-bookkept data sets except the batch to-be-bookkept data set in the more than one to-be-bookkept data set. The other data storage components include data storage components except the batch data storage component in the more than one data storage component. For example, it may perform data writing operations in parallel on (m−1) data storage components according to (m−1) to-be-bookkept data sets. The (m−1) to-be-bookkept data sets include to-be-bookkept data sets except the to-be-bookkept data set $A_b$ in the m to-be-bookkept data sets. The (m−1) data storage components include data storage components except the data storage component $C_b$ in the m data storage components. In this embodiment, by performing the data writing operations on the more than one data storage component in parallel, the more than one to-be-bookkept data set can be written in parallel, thus improving the network performance of the block chain and reducing the response time of external business.

In the embodiment of this disclosure, the ledger storage is divided into three major data storage components. Jointly refer to FIG. 3A. The three major data storage components may include a data storage component 201f for storing block data, a data storage component 202f for storing status data, and a data storage component 203f for storing read-write data.

The embodiment of this disclosure uses an asynchronous bookkeeping method to store the three to-be-bookkept data sets separately to avoid the dependence on read-write resources and improve the overall performance of the block chain network. In an example, while the to-be-bookkept data set 201e is written into the data storage component 201f, data writing operations are performed on the data storage component 202f and the data storage component 203f in parallel to write the to-be-bookkept data set 202e into the data storage component 202f and write the to-be-bookkept data set 203e into the data storage component 203f. The to-be-bookkept data set 201e is written into the data storage component 201f through a batch data writing instruction. The to-be-bookkept data set 202e is written into the data storage component 202f through a batch data writing instruction. The to-be-bookkept data set 203e is written into the data storage component 203f through a batch data writing instruction.

It is to be understood that in a case that the to-be-bookkept data set is successfully written into the data storage component, the data storage result returned by the data storage component is a data storage success result; in a case that the to-be-bookkept data set is not successfully written into the data storage component, the data storage result returned by the data storage component is a data storage failure result. Referring to FIG. 3A, the consensus node 20c acquires the data storage results returned by the three data storage components respectively. The data storage component 201f returns a data storage failure result 201g. The data storage component 202f returns a data storage success result 202g. The data storage component 203f returns a data storage success result 203g.

In step S103, in a case that a data storage failure result exists in the data storage results, a block checkpoint corresponding to the block file and component checkpoints respectively corresponding to the more than one data storage component are acquired. The block checkpoint is the maximum block height in the block file. The component checkpoints include the maximum block height respectively corresponding to the more than one data storage component.

In an example, each to-be-bookkept data set performs data writing operations in parallel to obtain corresponding data storage results. If a data storage failure result exists in more than one data storage result, it indicates that the parallel data writing operations are not successful and it requires rewriting. For example, in a case that a data storage failure result existing in m data storage results, the computer device determines the data storage component corresponding to a data storage result that is the data storage failure result as a target data storage component; acquires a target to-be-bookkept data set associated with the target data storage component from the m to-be-bookkept data sets; performs a data writing operation on the target data storage component according to the target to-be-bookkept data set to acquire a data rewriting storage result of the target data storage component; in a case that the data rewriting storage result is the data storage failure result, statistically collects the number of operations that the data writing operation is performed on the target data storage component; in a case that the number of operations is less than a number-of-operations threshold, performs a data writing operation on the target data storage component again according to the target to-be-bookkept data set; in a case that the number of operations is equal to the number-of-operations threshold, acquires a block checkpoint corresponding to the block file and component checkpoints respectively corresponding to the m data storage components.

The target data storage component is a data storage component corresponding to the data storage failure result. The target to-be-bookkept data set is a to-be-bookkept data set associated with the target data storage component, that is, the data writing operation of the target to-be-bookkept data set fails, the target to-be-bookkept data set fails to be successfully stored, and then the computer device performs a data writing operation on the target data storage component according to the target to-be-bookkept data set to obtain a data rewriting storage result. In a case that the data rewriting storage result is still the data storage failure result, it statistically collects the number of operations that the data writing operation is performed on the target data storage component. In a case that the number of operations is less than the number-of-operations threshold, it performs a data writing operation on the target data storage component again until the data rewriting storage result is storage success. In a case that the number of operations is equal to the number-of-operations threshold, it performs the operation of acquiring a block checkpoint corresponding to the block file and component checkpoints respectively corresponding to the more than one data storage component. In order to ensure the consistency and integrity of the ledger data, in the data writing process, in a case that any data storage component fails to be written, the embodiment of this disclosure will adopt a limited retry mechanism until the writing succeeds or the retry is out of range. Refer to FIG. 3A again. In FIG. 3A, the exemplary data storage component 201f fails to write the to-be-bookkept data set 201e, so the data storage component 201f returns the data storage failure result 201g. A data storage success result 202g can represent that the to-be-bookkept data set 202e is successfully written into the data storage component 202f. A data storage success result 203g can represent that the to-be-bookkept data set 203e is successfully written into the data storage component 203f.

Since the to-be-bookkept data set 201e is not successfully written to the data storage component 201f, the consensus node 20c may determine the data storage component 201f as the target data storage component, and determine the to-be-bookkept data set 201e as the target to-be-bookkept data set. Referring to FIG. 3A, the consensus node 20c performs a data writing operation on the data storage component 201f again according to the to-be-bookkept data set 201e, and acquires a data rewriting storage result of the data storage component 201f It is to be understood that, in a case that the data rewriting storage result is the data storage failure result, the number of operations that the data writing operation is performed on the data storage component 201f is statistically collected; in a case that the number of operations is less than a number-of-operations threshold, a data writing operation is performed on the data storage component 201f again according to the to-be-bookkept data set 201e; in a case that the number of operations is equal to the number-of-operations threshold, the consensus node 20c acquires a block checkpoint corresponding to the block file 20d and component checkpoints respectively corresponding to the three data storage components. The component checkpoint is the maximum block height recorded in the data storage component. It is to be understood that the number-of-operations threshold can be set according to the actual application scenario.

In step S104, a data storage component in an abnormal component status in the more than one data storage component is determined according to the block checkpoint and the component checkpoints, and a data writing operation is performed on the data storage component in the abnormal component status according to the block file.

For example, the component checkpoints correspond to the data storage components, that is, each data storage component corresponds to a component checkpoint. In a case that the number of data storage components is m, the computer device determines a component checkpoint less than the block checkpoint in the m component checkpoints as a to-be-updated component checkpoint; determines a data storage component corresponding to the to-be-updated component checkpoint in the m data storage components as a to-be-recovered data storage component, a component status of the to-be-recovered data storage component being the abnormal component status; determines a to-be-recovered block height interval of the to-be-recovered data storage component according to the to-be-updated component checkpoint and the block checkpoint; acquires a to-be-recovered data set belonging to the to-be-recovered block height interval from the block file, a data class corresponding to the to-be-recovered data set being the same as a data class corresponding to the to-be-recovered data storage component; performs a data writing operation on the to-be-recovered data storage component according to the to-be-recovered data set.

The component checkpoints correspond to the data storage components. Each data storage component corresponds to a component checkpoint, that is, the number of the component checkpoints is the same as the number of the data storage components. The to-be-updated component checkpoint in the component checkpoints is a component checkpoint less than the block checkpoint. The computer device determines a to be-recovered data storage component from the more than one data storage component. The to-be-recovered data storage component is a data storage component corresponding to the to-be-updated component checkpoint. A component status of the to-be-recovered data storage component is the abnormal component status. That is, a to-be-recovered data storage component in the abnormal component status is determined from the more than one data storage component. The to-be-recovered data storage component corresponds to the to-be-updated component checkpoint. The computer devices determine a to-be-recovered block height interval of the to-be-recovered data storage component according to the to-be-updated component checkpoint and the block checkpoint. Specifically, it may determine a to-be-recovered block height interval of the to-be-recovered data storage component by querying the block checkpoint corresponding to the to-be-updated component checkpoint. The computer device acquires a to-be-recovered data set belonging to the to-be-recovered block height interval from the block file. The to-be-recovered data set and the to-be-recovered data storage component have the same data class. The computer device may search to obtain the to-be-recovered data set from the block file according to the to-be-recovered block height interval. The computer device performs a data writing operation on the to-be-recovered data storage component according to the to-be-recovered data set, so as to determine the to-be-recovered data storage component and the to-be-recovered data set through the block checkpoint and the component checkpoint aiming at the to-be-bookkept data set that is not successfully written into the data storage component, and rewrite the to-be-recovered data storage component according to the to-be-recovered data set to ensure the consistency and security of the block chain data.

In a case that there is a to-be-bookkept data set that is not successfully written into the data storage component, the consensus node may also recover the to-be-recovered data in the to-be-bookkept data set through the block file. Please jointly refer to FIG. 3B, which is a schematic diagram of a scenario of blockchain-based data processing according to an embodiment of this disclosure. The block file 20d in FIG. 3B has the same meaning as the block file 20d in FIG. 3A. Similarly, the data storage component 201f, the data storage component 202f, the data storage component 203f and the to-be-bookkept data set 201e in FIG. 3B also have the same meaning.

Figure 3B:
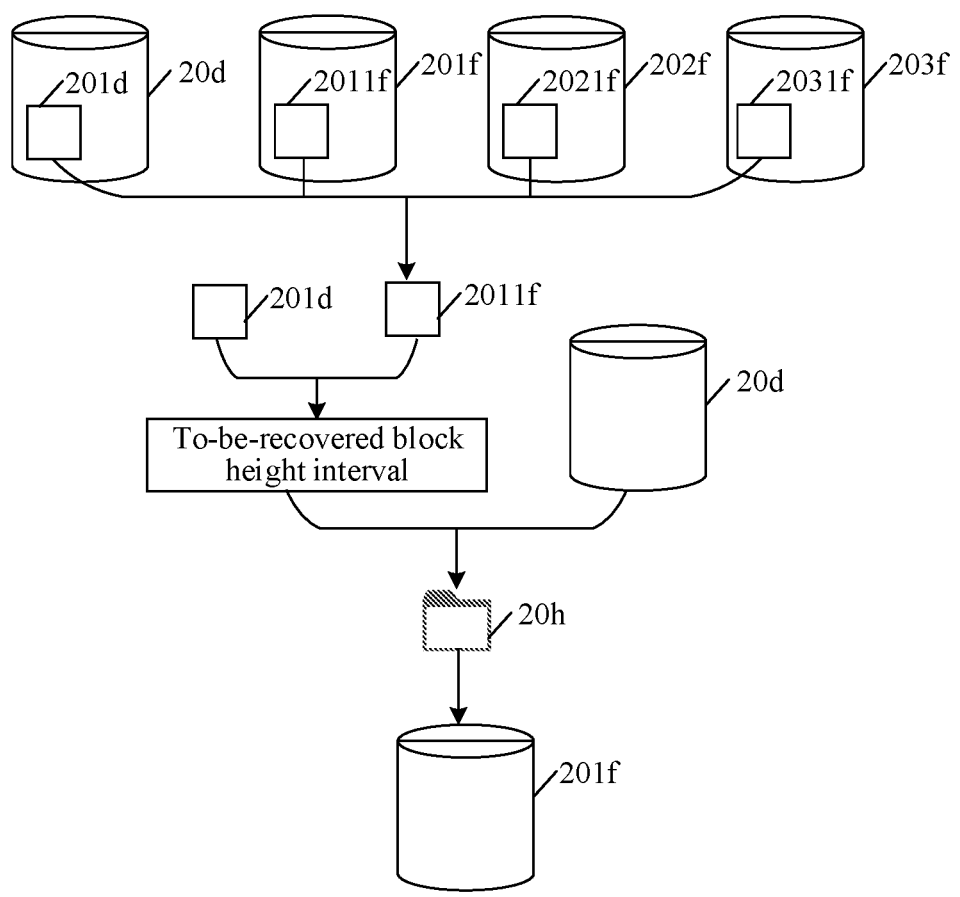
FIG. 3B is a schematic diagram of a scenario of blockchain-based data processing according to an embodiment of this disclosure.

Referring to FIG. 3B, in a case that the number of operations is equal to the number-of-operations threshold, the consensus node acquires a block checkpoint 201d corresponding to the block file 20d (equal to the maximum block height of the block 20a in FIG. 3A), and component checkpoints respectively corresponding to three data storage components, for example, a component checkpoint 2011f, a component checkpoint 2021f and a component checkpoint 2031f illustrated in FIG. 3B. The consensus node compares the three component checkpoints with the block checkpoint 201d, and determines a component checkpoint less than the block checkpoint 201d as a to-be-updated component checkpoint, for example, the component checkpoint 2011f illustrated in FIG. 3B. In this case, it can be determined that the block data in the block file 20d is not completely written into the data storage component 201f The block data in the block file 20d may include the block data corresponding to the block 20a, that is, the to-be-bookkept data set 201e.

Further, the consensus node determines the data storage component corresponding to the to-be-updated component checkpoint as the to-be-recovered data storage component. For example, the data storage component 201f illustrated in FIG. 3B is the to-be-recovered data storage component. Since the data storage component 201f has block data that are not written, the component status of the data storage component 201f can be determined as the abnormal component status. It is to be understood that after the data storage component 202f successfully writes the status data in the block file 20d (such as the to-be-bookkept data set 202e illustrated in FIG. 3A), it can be determined that the component status of the data storage component 202f is a normal component status. Similarly, after the data storage component 203f successfully writes the to-be-bookkept data set 203e, the consensus node can determine that the component status of the data storage component 203f is the normal component status.

The consensus node determines a to-be-recovered block height interval of the to-be-recovered data storage component according to the to-be-updated component checkpoint and the block checkpoint. Assuming that block 20a includes a block 8, a block 9 and a block 10, then the block checkpoint 201d is block height 10. Assuming that the component checkpoint 2011f is block height 8, it can be determined that the to-be-recovered block height interval includes block height 9 to block height 10. Therefore, the consensus node may acquire a to-be-recovered data set 20h from block file 20d belonging to the to-be-recovered block height interval, that is, the block data in the block 9 to the block 10, and then, perform a data writing operation on the to-be-recovered data storage component according to the to-be-recovered data set 20h. In an exemplary implementation, the consensus node may write the block data corresponding to the block 20a (that is, the block data respectively corresponding to the block 8 to the block 10) as the to-be-recovered data set again into the data storage component 201f In this case, the data storage component 201f deletes the block data corresponding to the block 8, and then performs a writing operation on the to-be-recovered data set.

In the exemplary application, in a case that the to-be-bookkept data set is not completely and successfully written, the data storage component may delete part of the data that has been written. For example, the data storage component 201f is abnormal in the process of writing the to-be-bookkept data set 201e, and a part of the data in the to-be-bookkept data set 201e is written. In this case, the data storage component 201f may delete part of the data that has been written. It is to be understood that in a case that the to-be-bookkept data set is successfully written, the data storage component may update the component checkpoint according to the newly written data set.

In the embodiment of this disclosure, in a case that a block that has passed the new consensus is acquired, it may be added to the block file, and more than one to-be-bookkept data set of different data classes aiming at the block may be acquired from the block file. Further, data writing operations are performed in parallel on the same number of data storage components according to the more than one to-be-bookkept data set and data storage results respectively corresponding to the data storage components are acquired. It is to be understood that the more than one data storage component stores data of different data classes, that is, a data storage component is used for storing a to-be-bookkept data set of a data class. In a case that a data storage failure result exists in more than one data storage result, it indicates that a to-be-bookkept data set that is not successfully written into the data storage component exists. In this case, a block checkpoint corresponding to the block file and component checkpoints respectively corresponding to the more than one data storage component are acquired. A data storage component in an abnormal component status in the more than one data storage component, i.e., the data storage component that does not successfully write the to-be-bookkept data set of the corresponding data class, may be determined according to the block checkpoint and the more than one component checkpoint. In this case, a data writing operation may be performed on the data storage component in the abnormal component status according to the block file. Accordingly, in the embodiment of this disclosure, by performing the data writing operations on the more than one data storage component in parallel, the more than one to-be-bookkept data set can be written in parallel, thus improving the network performance of the block chain and reducing the response time of external business. In addition, in a case that a data storage failure result exists in more than one data storage result, the embodiment of this disclosure can determine the data storage component in the abnormal component status through the block checkpoint and more than one component checkpoint, and perform a data writing operation on the data storage component in the abnormal component status again according to the block file, thus ensuring the data consistency between the cache (which can be equivalent to more than one to-be-bookkept data set) and the distributed memory (which is equivalent to more than one data storage component) and avoiding data loss.

In an embodiment, before acquiring a block checkpoint corresponding to the block file and component checkpoints respectively corresponding to the more than one data storage component, the method further includes: determining the data storage component corresponding to a data storage result that is the data storage failure result as a target data storage component; acquiring the number of operations that the data writing operation is performed on the target data storage component; and in a case that the number of operations is equal to the number-of-operations threshold, performing the operation of acquiring a block checkpoint corresponding to the block file and component checkpoints respectively corresponding to the more than one data storage component.

For example, aiming at the target data storage component corresponding to the data storage failure result, the computer device acquires the number of operations that the data writing operation is performed on the target data storage component. The number of operations may be updated each time the data writing operation is performed on the target data storage component. In a case that the number of operations is equal to the number-of-operations threshold, which may be preset according to the actual need, the computer device performs the operation of acquiring a block checkpoint corresponding to the block file and component checkpoints respectively corresponding to the more than one data storage component. In this embodiment, in a case that the number of operations is equal to the number-of-operations threshold, which indicates that the maximum number of rewriting is reached, the operation of acquiring a block checkpoint and component checkpoints is performed, and a data writing operation is performed aiming at the data storage component in the abnormal component status, so as to ensure data consistency and avoid data loss. In an embodiment, the blockchain-based data processing method further includes: comparing the number of operations with the number-of-operation threshold; in a case that the number of operations is less than the number-of-operations threshold, performing a data writing operation on the target data storage component according to the target to-be-bookkept data set to acquire a data rewriting storage result of the target data storage component, the target to-be-bookkept data set being a to-be-bookkept data set associated with the target data storage component in the more than one to-be-bookkept data set; in a case that the data rewriting storage result is the data storage failure result, updating the number of operations and returning to the operation of comparing the number of operations with the number-of-operations threshold.

The target to-be-bookkept data set is a to-be-bookkept data set associated with the target data storage component in the more than one to-be-bookkept data set. For example, aiming at the target data storage component corresponding to the data storage failure result, the computer device acquires the number of operations that the data writing operation is performed on the target data storage component. The number of operations may be updated each time the data writing operation is performed on the target data storage component. The computer device compares the number of operations with the number-of-operations threshold. In a case that the number of operations is less than the number-of-operations threshold, the computer device performs a data writing operation on the target data storage component according to the target to-be-bookkept data set to acquire a data rewriting storage result of the target data storage component. In a case that the data rewriting storage result is the data storage failure result, the computer device updates the number of operations and returns to the operation of comparing the number of operations with the number-of-operations threshold, so as to determine again whether the maximum number of rewriting is reached. In this embodiment, in a case that the maximum number of rewriting is not reached, a rewriting operation is performed, and whether the updated number of operations reaches the maximum number will be determined, so as to ensure data consistency and avoid data loss.

Figure 4:
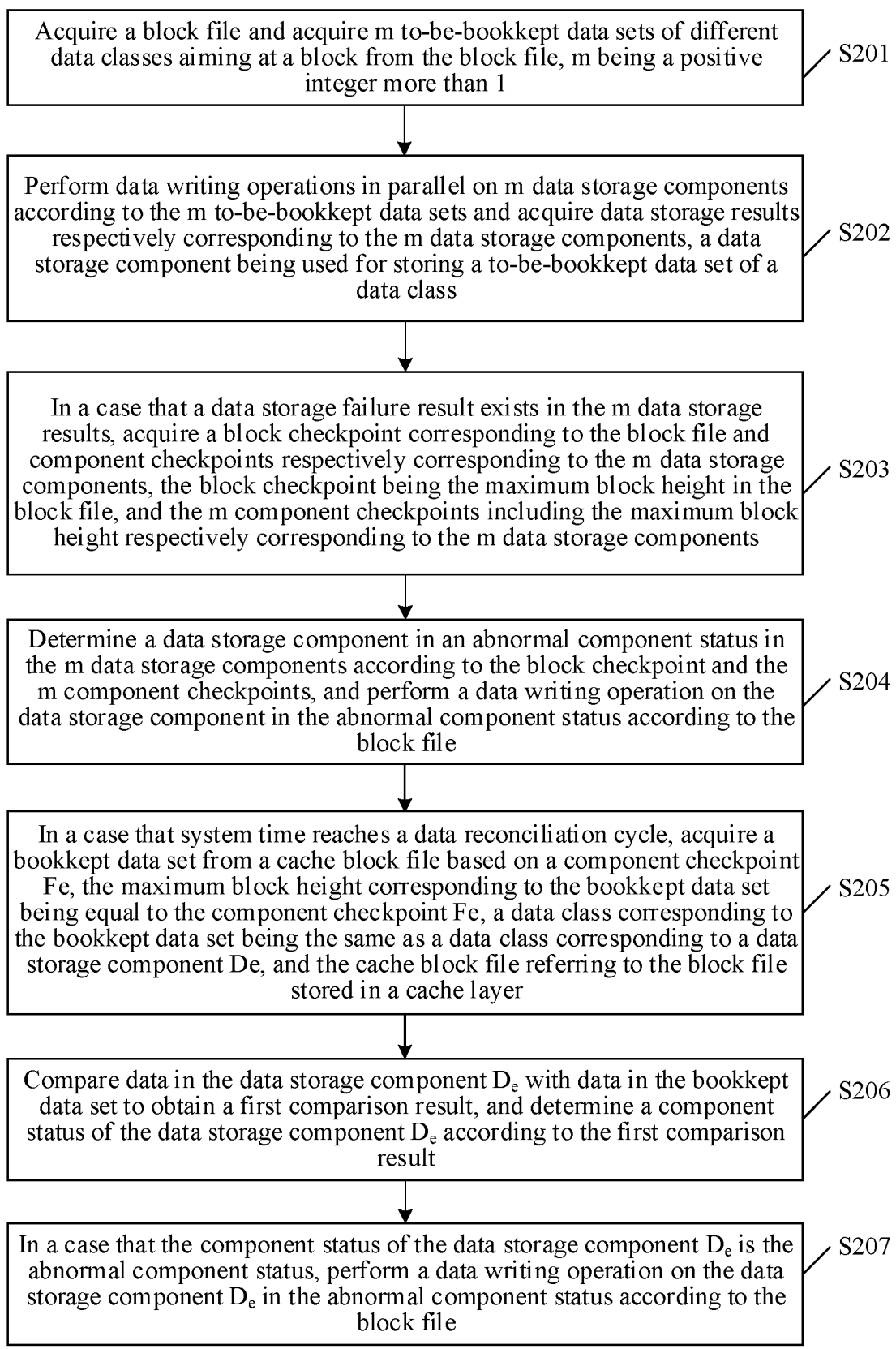
FIG. 4 is a flowchart of a blockchain-based data processing method according to an embodiment of this disclosure.

Further, refer to FIG. 4, which is a flowchart of a blockchain-based data processing method according to an embodiment of this disclosure. The blockchain-based data processing method may be executed by a computer device. The computer device may include any one of consensus nodes in the consensus network 101 in FIG. 1. Referring to FIG. 4, the data processing process may include the following steps:

In step S201, a block file is acquired and m to-be-bookkept data sets of different data classes aiming at a block are acquired from the block file. m is a positive integer more than 1.

In step S202, data writing operations are performed in parallel on m data storage components according to the m to-be-bookkept data sets and data storage results respectively corresponding to the m data storage components are acquired. A data storage component is used for storing a to-be-bookkept data set of a data class.

In step S203, in a case that a data storage failure result exists in m data storage results, a block checkpoint corresponding to the block file and component checkpoints respectively corresponding to the m data storage components are acquired. The block checkpoint is the maximum block height in the block file. The m component checkpoints include the maximum block height respectively corresponding to the m data storage components.

In step S204, a data storage component in an abnormal component status in the m data storage components is determined according to the block checkpoint and the m component checkpoints, and a data writing operation is performed on the data storage component in the abnormal component status according to the block file. For the specific process corresponding to step S201 to step S204, a reference may be made to the description in the embodiment corresponding to FIG. 2 above.

In step S205, in a case that system time reaches a data reconciliation cycle, a bookkept data set is acquired from a cache block file based on a component checkpoint $F_e$. The maximum block height corresponding to the bookkept data set is equal to the component checkpoint $F_e$. A data class corresponding to the bookkept data set is the same as a data class corresponding to a data storage component $D_e$. The cache block file refers to the block file stored in a cache layer.

In a case that a data reconciliation cycle is reached, the computer device acquires a bookkept data set from a cache block file based on a first component checkpoint. The maximum block height corresponding to the bookkept data set is equal to the first component checkpoint. A data class corresponding to the bookkept data set is the same as a data class corresponding to the first data storage component. The cache block file refers to the block file stored in a cache layer. The more than one data storage component includes a first data storage component. The first data storage component may be any one of the more than one data storage component. The component checkpoints include a first component checkpoint corresponding to the first data storage component. For example, the m data storage components include a first data storage component, which is specifically a data storage component $D_e$. The m component checkpoints include a first component checkpoint corresponding to the first data storage component, which is specifically a component checkpoint $F_e$ corresponding to the data storage component $D_e$, e is a positive integer and e is less than or equal to m. That is, the first data storage component may be any one of the m data storage components. The data reconciliation cycle is used for periodically performing global verification on the block chain ledger, so as to ensure the integrity of the block chain ledger data. In a case that the system time reaches the data reconciliation cycle, it may trigger full reconciliation processing. The system time may be the time of a block chain data processing system, which specifically may be the actual time. The bookkept data set is data that has been bookkept in the block chain ledger, that is, successfully stored.

The embodiment of this disclosure provides a method for guaranteeing consistency of ledger data in an asynchronous bookkeeping process of a block chain. This method aims to achieve the data consistency between the cache and distributed memory of the consensus node and the data consistency with the distributed memory of the ledgers of other consensus nodes through three guarantees in a case that the consensus node adopts asynchronous bookkeeping. The three guarantees can be summarized as follows: 1. In case of data writing failure, the writing operation is retried for a limited number of times. For this guarantee, a reference may be made to the description of step S103 in the embodiment corresponding to FIG. 2. 2. As a redo log, the block file is used for redoing the to-be-recovered data set. For the generation and function of the to-be-recovered data set, a reference may be made to the description in step S104 in the embodiment corresponding to FIG. 2 above. In addition, the block file may also be used for generating the to-be-recovered data in a case that the data is lost during the switchover of the distributed memory. For the process of generating the to-be-recovered data, refer to the description below. 3. Regular full data verification, i.e., regular ledger verification. Refer to the description below. In order to improve the network performance of the block chain, such as facilitating the reading of data, the consensus node 20c may generate a cache block file 40a in a cache layer, and the data stored therein are the same as the data in the block file described above.

Figure 5:
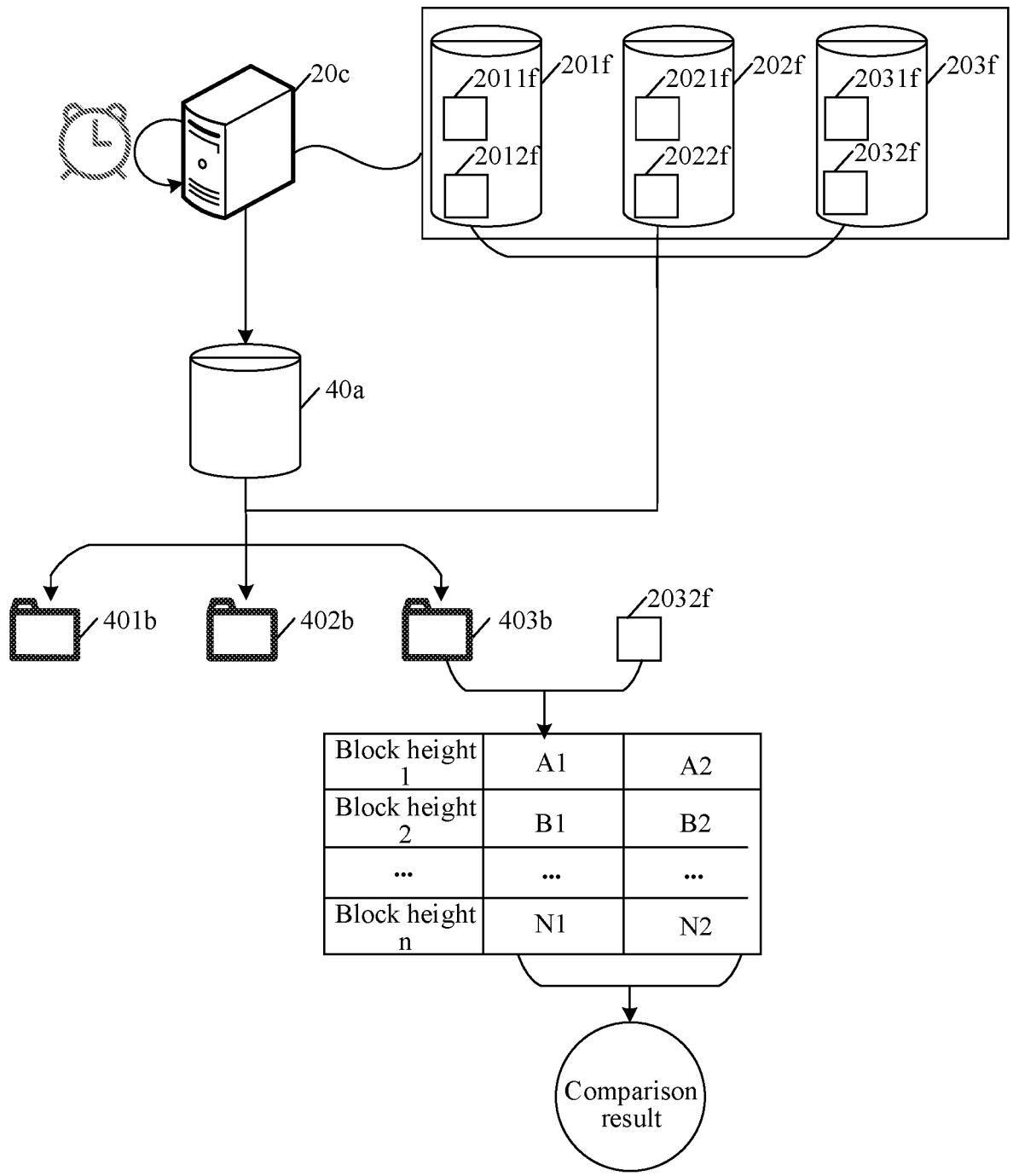
FIG. 5 is a schematic diagram of a scenario of blockchain-based data processing according to an embodiment of this disclosure.

In view of the data loss during the switchover of the distributed memory, the embodiment of this disclosure adopts a regular full reconciliation method. Jointly refer to FIG. 5, which is a schematic diagram of a scenario of blockchain-based data processing according to an embodiment of this disclosure. Referring to FIG. 5, the consensus node 20c (equivalent to the consensus node 20c in FIG. 2) may set the data reconciliation cycle, which is used for periodically verifying the ledger (full data) of the consensus node 20c, that is, verifying the integrity of the ledger data. The data reconciliation cycle may be set according to the actual application scenario.

Assuming that the data storage component 201f is used for storing data of a block class, the data storage component 202f is used for storing data of a status class and the data storage component 203f is used for storing data of a read-write class, the data storage component 201f may include block data 2012f in a ledger corresponding to the consensus node 20c, and the data storage component 202f may include status data 2022f in a ledger corresponding to the consensus node 20c, and the data storage component 203f may include read-write data 2032f in a ledger corresponding to the consensus node 20c.

According to the embodiment corresponding to FIG. 2 above, it can be seen that, in the embodiment of this disclosure, ledger storage is divided into three major data storage components, namely, the data storage component 201f, the data storage component 202f and the data storage component 203f illustrated in FIG. 5. The data storage component 201f can record the component checkpoint 2011f. The data storage component 202f can record the component checkpoint 2021f. The data storage component 203f can record the component checkpoint 2031f. Under normal conditions, the three component checkpoints are the same. In a case that the component status of a certain data storage component is abnormal, the three component checkpoints may be different.

The consensus node 20c acquires a bookkept data set 401b from the cache block file 40a according to the component checkpoint 2011f recorded in the data storage component 201f. Assuming that the component checkpoint 2011f is block height 10, the bookkept data set 401b may include the block data corresponding to the minimum block height in the cache block file 40a to the block data in the block 10. The consensus node 20c acquires a bookkept data set 402b from the cache block file 40a according to the component checkpoint 2021f recorded in the data storage component 202f. Assuming that the component checkpoint 2021f is block height 10, the bookkept data set 402b may include the status data corresponding to the minimum block height in the cache block file 40a to the status data in the block 10. The consensus node 20c acquires a bookkept data set 403b from the cache block file 40a according to the component checkpoint 2031f recorded in the data storage component 203f. Assuming that the component checkpoint 2031f is block height 10, the bookkept data set 403b may include the read-write data corresponding to the minimum block height in the cache block file 40a to the read-write data in the block 10.

It is to be understood that the cache block file 40a may not store the full data. For example, during data storage of the block 20a illustrated in FIG. 3A, the cache block file 40a may delete the previously bookkept data. The deletion method may be regular deletion or quantitative deletion from the cache block file 40a. For example, the cache block file can store the data respectively corresponding to the latest ten blocks. Other methods may also be adopted.

In step S206, data in the data storage component $D_e$ are compared with data in the bookkept data set to obtain a first comparison result, and a component status of the data storage component $D_e$ is determined according to the first comparison result.

The computer device compares data in the first data storage component with data in the bookkept data set to obtain a first comparison result, and determines a component status of the first data storage component according to the first comparison result. By comparing the data in the data storage component $D_e$ with the data in the bookkept data set, for example, by comparing the data identity, whether the data in the data storage component $D_e$ has been successfully stored can be determined, that is, whether the bookkeeping process has been successfully completed can be determined, thus determining the component status of the data storage component $D_e$. In a case that the first comparison result indicates that the data are the same, it can be determined that the component status of the data storage component $D_e$ is a normal component status. Otherwise, it is an abnormal component status.

In an embodiment, the data classes include a status class. The process of determining the component status of the first data storage component includes: in a case that the data class corresponding to the first data storage component is a status class, acquiring a first version identity aiming at first status data in the first data storage component and acquiring a second version identity aiming at the first status data in the bookkept data set; comparing the first version identity with the second version identity to obtain a status comparison result; in a case that the status comparison result indicates that the first version identity is different from the second version identity, determining that the component status of the first data storage component is the abnormal component status.

For example, in a case that the data class corresponding to the first data storage component is a status class, a first version identity aiming at first status data in the first data storage component is compared with a second version identity aiming at the first status data in the bookkept data set, so as to determine the component status of the first data storage component according to the obtained status comparison result.

In this embodiment, aiming at the data storage component of the status class, by comparing the version identities of the same status data in the first data storage component and in the bookkept data set to achieve the comparison of the data in the first data storage component, the component status of the first data storage component can be accurately determined, so as to ensure the integrity of full data.

In an embodiment, the data classes include a block class. The process of determining the component status of the first data storage component includes: in a case that the data class corresponding to the first data storage component such as the data storage component $D_e$ is a block class, acquiring a first block identity aiming at first block height in the data storage component $D_e$ and acquiring a second block identity aiming at the first block height in the bookkept data set; comparing the first block identity with the second block identity to obtain a block comparison result; in a case that the block comparison result indicates that the first block identity is different from the second block identity, determining that the component status of the data storage component $D_e$ is the abnormal component status.

For example, in a case that the data class corresponding to the first data storage component is a block class, a first block identity aiming at the first block height in the first data storage component is compared with a second block identity aiming at the first block height in the bookkept data set, so as to determine the component status of the first data storage component according to the obtained block comparison result. In this embodiment, aiming at the data storage component of the block class, by comparing the block identities of the same block height in the first data storage component and in the bookkept data set to achieve the comparison of the data in the first data storage component, the component status of the first data storage component can be accurately determined, so as to ensure the integrity of full data.

In an embodiment, the data classes include a read-write class. The process of determining the component status of the first data storage component includes: in a case that the data class corresponding to the first data storage component such as the data storage component $D_e$ is a read-write class, acquiring a first write data identity aiming at second block height in the data storage component $D_e$ and acquiring a second write data identity aiming at the second block height in the bookkept data set; comparing the first write data identity with the second write data identity to obtain a read-write comparison result; in a case that the read-write comparison result indicates that the first write data identity is different from the second write data identity, determining that the component status of the data storage component $D_e$ is the abnormal component status.

For example, in a case that the data class corresponding to the first data storage component is a read-write class, a first write data identity aiming at the second block height in the first data storage component is compared with a second write data identity aiming at the second block height in the bookkept data set, so as to determine the component status of the first data storage component according to the obtained read-write comparison result. In this embodiment, aiming at the data storage component of the read-write class, by comparing the write data identities of the same block height in the first data storage component and in the bookkept data set to achieve the comparison of the data in the first data storage component, the component status of the first data storage component can be accurately determined, so as to ensure the integrity of full data.

Combined with step S205 and FIG. 5, the consensus node 20*c* performs reconciliation processing on the full data (including full block data, full status data, and full read-write data) in the ledger. When the data in the bookkept data set 403*b* and the data in the data storage component 203*f* (equivalent to the read-write data 2032*f* illustrated in FIG. 5) are reconciled, the consensus node 20*c* may compare the first write data identity corresponding to the each second block height in the data storage component 203*f* with the second write data identity corresponding to the second block height in the bookkept data set 403*b*, for example, as illustrated in FIG. 5, compare a write data identity A1 (assumed to be the first write data identity in the data storage component 203*f*) corresponding to block height 1 with a write data identity A2 (assumed to be the second write data identity in the bookkept data set 403*b*). In a case that the comparison result indicates that the write data identity A1 is different from the write data identity A2, it can be determined that the write data identity A1 aiming at the block 1 in the data storage component 203 is incorrect (abnormal) data. In a case that they are the same, it can be determined that the write data identity A1 aiming at the block 1 in the data storage component 203 is accurate (normal) data. Similarly, a write data identity B1 corresponding to block height 2 is compared with a write data identity B2. In a case that the comparison result indicates that the write data identity B1 is different from the write data identity B2, it can be determined that the write data identity B1 aiming at the block 2 in the data storage component 203 is incorrect (abnormal) data. In a case that they are the same, it can be determined that the write data identity B1 aiming at the block 2 in the data storage component 203 is accurate (normal) data. Similarly, a write data identity N1 corresponding to block height n is compared with a write data identity N2. In a case that the comparison result indicates that the write data identity N1 is different from the write data identity N2, it can be determined that the write data identity N1 aiming at the block n in the data storage component 203 is incorrect (abnormal) data. In a case that they are the same, it can be determined that the write data identity N1 aiming at the block n in the data storage component 203 is accurate (normal) data.

The above is described by taking the comparison between the write data identity in the data storage component 203 and the write data identity in the bookkept data set 403*b* as an example. It is to be understood that the process of comparing the read data identity in the data storage component 203 with the read data identity in the bookkept data set 403*b* is the same as the process described above.

Aiming at block height 1, block height 2, . . . , block height n, in a case that the write data identity in the data storage component 203 and the write data identity in the bookkept data set 403*b* are the same, and the read data identity in the data storage component 203 and the read data identity in the bookkept data set 403*b* are the same, it can be determined that the component status of the data storage component 203*f* is the normal component status. In a case that there is a comparison result that is different, the consensus node 20*c* can determine that the component status of the data storage component 203*f* is the abnormal component status.

It is to be understood that the process of determining the component status of the data storage component 201*f* by the consensus node 20*c* is the same as the process of determining the component status of the data storage component 203*f*, except that the data compared are different. In the process of determining the component status of the data storage component 201*f*, the first block identity aiming at each block height in the data storage component 201*f* is compared with the second block identity aiming at each block height in the bookkept data set 401*b*. Similarly, the process of determining the component status of the data storage component 202*f* by the consensus node 20*c* is the same as the process of determining the component status of the data storage component 203*f*, except that the data compared are different. Here, the first version identity corresponding to each first status data in the data storage component 201*f* is compared with the second version identity of the corresponding status data in the bookkept data set 402*b*. In a case that the comparison result indicates that the two version identities are not the same, it indicates that the data storage component 202*f* has an abnormal situation and needs to be recovered. It is to be understood that in a case that the data class is other classes, the appropriate data may be selected for reconciliation according to the actual data class. The embodiment of this disclosure is described by taking the block class, status class and read-write class as examples.

In step S207, in a case that the component status of the data storage component $D_e$ is the abnormal component status, a data writing operation is performed on the data storage component $D_e$ in the abnormal component status according to the block file.

In a case that the component status of the first data storage component is the abnormal component status, the computer device performs a data writing operation on the first data storage component in the abnormal component status according to the block file. For example, in a case that the component status of the first data storage component is the abnormal component status, a data writing operation is performed on the first data storage component to rewrite the first data storage component to ensure that the data of the first data storage component can be successfully bookkept. For example, refer to FIG. 5 again. In a case that the write data identity A1 is different from the write data identity A2, the consensus node 20c may determine that the write data identity A1 aiming at the block 1 in the data storage component 203f is incorrect (abnormal) data, and then determine that the component status of the data storage component 203f is the abnormal component status. The consensus node 20c may acquire the write data identity aiming at target block height (such as block height 1 above) from the block file, use the target block height as a new index key and a write data identity corresponding to the target block height as a new index value, generate a new index pair, and then write the new index pair into the data storage component 203f to replace the write data identity A1. The target block height represents the block height corresponding to the abnormal write data identity in the data storage component 203f.

In an embodiment, the consensus node 20c may further determine whether the write data identity corresponding to each transaction information in the block 1 is accurate after determining that the write data identity A1 aiming at the block 1 in the data storage component 203f is incorrect (abnormal) data, that is, compare it with the write data identity of the corresponding transaction information in the block 1 in the bookkept data set 403b. The determining process is the same as the determining process of the write data identity corresponding to each block height in step S206. In a case that the consensus node 20c determines that the write data identity corresponding to the transaction information 1 in the block 1 in the data storage component 203f is not the same as the write data identity corresponding to the transaction information 1 in the block 1 in the bookkept data set 403b, it may acquire a write data identity corresponding to the transaction information 1 in the block 1 from the block file, use the acquired write data identity corresponding to the transaction information 1 in the block 1 as a new index value, use a transaction sequence number of the transaction information 1 as a new index key, generate a new index pair according to the new index value and the new index key, and write the new index pair into the data storage component 203f to replace the write data identity (i.e., the incorrect data) corresponding to the transaction information 1 in the block 1 in the data storage component 203f.

The above is described by taking the data class corresponding to the data storage component being a read-write class as an example. It is to be understood that in a case that the data class corresponding to the data storage component is a status class or block class, the process that the consensus node performs a writing operation again on the data storage component in the abnormal component status according to the block file is the same as that described above. In this embodiment, a regular full reconciliation method is adopted. In a case that the data reconciliation cycle is reached, the data in the data storage component are compared with the data in the bookkept data set to determine the component status of the data storage component according to the comparison result. In a case that the component status is the abnormal component status, a data writing operation is performed on the data storage component in the abnormal component status through the block file, thus avoiding the loss of data in the switchover of the distributed memory, so as to ensure the integrity of full data.

In an embodiment, the blockchain-based data processing method further includes: in a case that a data reconciliation cycle is reached, transmitting a data reconciliation request for requesting ledger data reconciliation to a consensus network, the data reconciliation request carrying the component checkpoints; acquiring to-be-reconciled data sets respectively corresponding to the component checkpoints returned by consensus nodes in the consensus network, a data class corresponding to a component checkpoint being the same as a data class corresponding to a to-be-reconciled data set, the more than one data storage component including a second data storage component, the to-be-reconciled data sets including a target to-be-reconciled data set, a data class corresponding to the second data storage component being the same as a data class corresponding to the target to-be-reconciled data set; comparing data in the target to-be-reconciled data set with data in the second data storage component to obtain a second comparison result, and determining a component status of the second data storage component according to the second comparison result; in a case that the component status of the second data storage component is the abnormal component status, performing a data writing operation on the second data storage component in the abnormal component status according to the block file.

The second data storage component may be any one of the more than one data storage components. The target to-be-reconciled data set corresponds to the second data storage component. The data reconciliation request carries component checkpoints. Through the data reconciliation request, the to-be-reconciled data set may be obtained from the consensus network, and the data in the to-be-reconciled data set of the same data class as the second data storage component may be compared with the data in the second data storage component, so as to determine the component status of the second data storage component.

For example, in a case that system time reaches a data reconciliation cycle, a data reconciliation request for requesting ledger data reconciliation is transmitted to a consensus network. The data reconciliation request carries m component checkpoints. m to-be-reconciled data sets returned by consensus nodes in the consensus network are acquired. A data class corresponding to a component checkpoint is the same as a data class corresponding to a to-be-reconciled data set. The m data storage components include a data storage component $H_i$. The m to-be-reconciled data sets include a to-be-reconciled data set $J_i$. A data class corresponding to the data storage component $H_i$ is the same as a data class corresponding to the to-be-reconciled data set $J_i$, where i is a positive integer and i is less than or equal to m. Data in the to-be-reconciled data set $J_i$ are compared with data in the data storage component $H_i$ to obtain a second comparison result, and a component status of the data storage component $H_i$ is determined according to the second comparison result. In a case that the component status of the data storage component $H_i$ is the abnormal component status, a data writing operation is performed on the data storage component $H_i$ in the abnormal component status according to the block file. In this embodiment, in a case that the data reconciliation cycle is reached, the to-be-reconciled data set is acquired from the consensus network through the data reconciliation request carrying the component checkpoints, and the data in the target to-be-reconciled data set of the same data class as the second data storage component is compared with the data in the second data storage component to determine the component status of the second data storage component. In a case that the component status is the abnormal component status, a data writing operation is performed on the second data storage component in the abnormal component status through the block file, thus avoiding the loss of data in the switchover of the distributed memory, so as to ensure the integrity of full data.

In an embodiment, in a case that the component status of the data storage component $H_i$, i.e., the second data storage component, is the abnormal component status, the specific process of performing a data writing operation on the data storage component $H_i$ in the abnormal component status according to the block file may include: in a case that the component status of the second data storage component, i.e., the data storage component $H_i$, is the abnormal component status and to-be-recovered data of the data storage component $H_i$ exist in the block file, performing a data writing operation on the data storage component $H_i$ in the abnormal component status according to the to-be-recovered data of the data storage component $H_i$ in the block file. It may further include: in a case that the component status of the data storage component $H_i$ is the abnormal component status and no to-be-recovered data of the data storage component $H_i$ exist in the block file, transmitting a data recovery request for requesting ledger data recovery to the consensus network, the data recovery request carrying a data identity of the to-be-recovered data of the data storage component $H_i$; acquiring the to-be-recovered data of the data storage component $H_i$ returned by the consensus nodes in the consensus network, and performing the data writing operation on the data storage component $H_i$ in the abnormal component status according to the to-be-recovered data of the data storage component $H_i$.

In this embodiment, aiming the second data storage component in a component status that is the abnormal component status, in a case that corresponding to-be-recovered data exist in the block file, a data writing operation is directly performed on the second data storage component through the to-be-recovered data. In a case that no corresponding to-be-recovered data exist in the block file, a data identity of the to-be-recovered data is acquired from the consensus network through the data recovery request, so as to acquire the to-be-recovered data based on the data identity to perform the data writing operation on the second data storage component. Therefore, it avoids the loss of data in the switchover of the distributed memory, so as to ensure the integrity of full data.

In an embodiment, the m data classes include a status class. The specific process of determining the component status of the data storage component $H_i$ according to the second comparison result may include: in a case that the data class corresponding to the second data storage component, i.e., the data storage component $H_i$, is a status class, acquiring a third version identity aiming at second status data in the data storage component $H_i$ and acquiring a fourth version identity aiming at the second status data in the target to-be-reconciled data set, i.e., a to-be-reconciled data set $J_i$; comparing the third version identity with the fourth version identity to obtain a second comparison result; in a case that the second comparison result indicates that the third version identity is less than the fourth version identity, determining that the component status of the data storage component $H_i$ is the abnormal component status.

For example, in a case that the data class corresponding to the second data storage component is a status class, a third version identity aiming at second status data in the second data storage component is compared with a fourth version identity aiming at the second status data in the target to-be-reconciled data set, so as to determine the component status of the second data storage component according to the obtained second comparison result. In this embodiment, aiming at the data storage component of the status class, by comparing the version identities of the same status data in the second data storage component and in the target to-be-reconciled data set to achieve the comparison of the data in the second data storage component, the component status of the second data storage component can be accurately determined, so as to ensure the integrity of full data.

In an embodiment, the m data classes include a block class. The specific process of determining the component status of the data storage component $H_i$ according to the second comparison result may include: in a case that the data class corresponding to the second data storage component, i.e., the data storage component $H_i$, is a block class, acquiring a third block identity aiming at third block data in the data storage component $H_i$ and acquiring a fourth block identity aiming at the third block data in the target to-be-reconciled data set, i.e., a to-be-reconciled data set $J_i$; comparing the third block identity with the fourth block identity to obtain a second comparison result; in a case that the second comparison result indicates that the third block identity is less than the fourth block identity, determining that the component status of the data storage component $H_i$ is the abnormal component status.

For example, in a case that the data class corresponding to the second data storage component is a block class, a third block identity aiming at third block data in the second data storage component is compared with a fourth block identity aiming at the third block data in the target to-be-reconciled data set, so as to determine the component status of the second data storage component according to the obtained second comparison result. In this embodiment, aiming at the data storage component of the block class, by comparing the block identities of the same block data in the second data storage component and in the target to-be-reconciled data set to achieve the comparison of the data in the second data storage component, the component status of the second data storage component can be accurately determined, so as to ensure the integrity of full data.

In an embodiment, the m data classes include a read-write class. The specific process of determining the component status of the data storage component $H_i$ according to the second comparison result may include: in a case that the data class corresponding to the second data storage component, i.e., the data storage component $H_i$, is a read-write class, acquiring a third write data identity aiming at fourth block height in the data storage component $H_i$ and acquiring a fourth write data identity aiming at the fourth block height in the target to-be-reconciled data set, i.e., a to-be-reconciled data set $J_i$; comparing the third write data identity with the fourth write data identity to obtain a second comparison result; in a case that the second comparison result indicates that the third write data identity is less than the fourth write data identity, determining that the component status of the data storage component $H_i$ is the abnormal component status.

For example, in a case that the data class corresponding to the second data storage component is a read-write class, a third write data identity aiming at the fourth block height in the second data storage component is compared with a fourth write data identity aiming at the fourth block height in the target to-be-reconciled data set, so as to determine the component status of the second data storage component according to the obtained second comparison result. In this embodiment, aiming at the data storage component of the read-write class, by comparing the write data identities of the same block height in the second data storage component and in the target to-be-reconciled data set to achieve the comparison of the data in the second data storage component, the component status of the second data storage component can be accurately determined, so as to ensure the integrity of full data.

As described above, the cache block file may not store full data, so in order to perform reconciliation processing on the full data in the ledger, the embodiment of this disclosure may further acquire ledger data of another consensus node in the consensus network. It is to be understood that the process of performing reconciliation processing on the ledgers respectively corresponding to two consensus nodes is the same as the process of performing reconciliation processing on the ledger of one consensus node by using cache block files. Refer to the description above.

In the embodiment of this disclosure, in a case that a block that has passed the new consensus is acquired, it may be added to the block file, and m to-be-bookkept data sets of different data classes aiming at the block may be acquired from the block file. Further, data writing operations are performed in parallel on m data storage components according to the m to-be-bookkept data sets and data storage results respectively corresponding to the m data storage components are acquired. It is to be understood that the m data storage components store data of different data classes, that is, a data storage component is used for storing a to-be-bookkept data set of a data class. In a case that a data storage failure result exists in m data storage results, it indicates that a to-be-bookkept data set that is not successfully written into the data storage component exists. In this case, a block checkpoint corresponding to the block file and component checkpoints respectively corresponding to the m data storage components are acquired. A data storage component in an abnormal component status in the m data storage components, i.e., the data storage component that does not successfully write the to-be-bookkept data set of the corresponding data class, may be determined according to the block checkpoint and the m component checkpoints. In this case, a data writing operation may be performed on the data storage component in the abnormal component status according to the block file. Accordingly, in the embodiment of this disclosure, by performing the data writing operations on the m data storage components in parallel, the m to-be-bookkept data sets can be written in parallel, thus improving the network performance of the block chain and reducing the response time of external business. In addition, in a case that a data storage failure result exists in m data storage results, the embodiment of this disclosure can determine the data storage component in the abnormal component status through the block checkpoint and m component checkpoints, and perform a data writing operation on the data storage component in the abnormal component status again according to the block file, thus ensuring the data consistency between the cache (which can be equivalent to m to-be-bookkept data sets) and the distributed memory (which is equivalent to m data storage components) and avoiding data loss.

Figure 6:
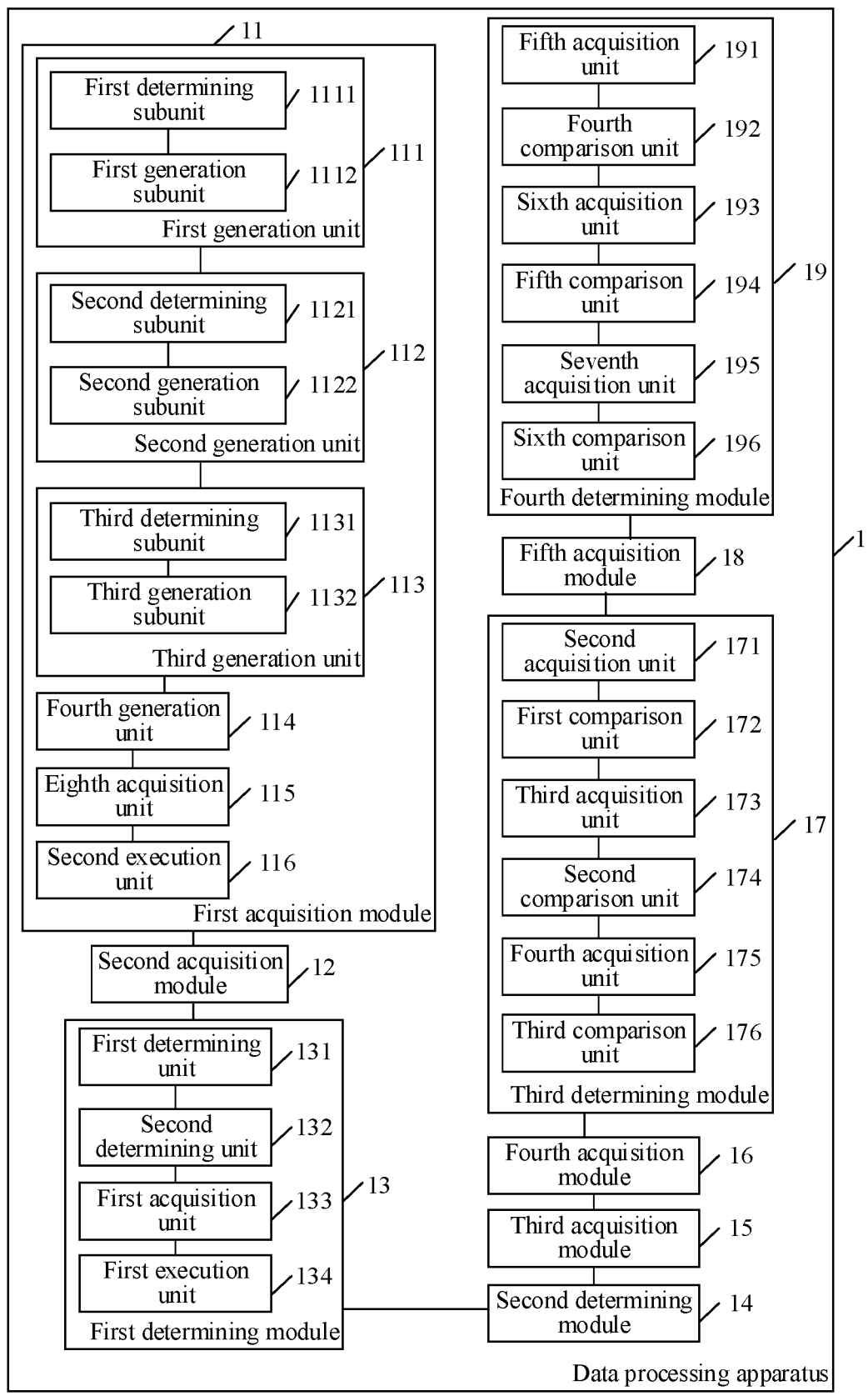
FIG. 6 is a schematic structural diagram of a blockchain-based data processing apparatus according to an embodiment of this disclosure.

Further, refer to FIG. 6, which is a schematic structural diagram of a blockchain-based data processing apparatus according to an embodiment of this disclosure. The blockchain-based data processing apparatus may be a computer-readable instruction (including program code) running in a computer device. For example, the data processing apparatus may be application software. The apparatus can be used for executing the corresponding steps in the method according to the embodiment of this application. Referring to FIG. 6, the data processing apparatus 1 may include a first acquisition module 11, a second acquisition module 12 and a first determining module 13. One or more modules, submodules, and/or units of the apparatus can be implemented by processing circuitry, software, or a combination thereof, for example.

The first acquisition module 11 is configured to acquire a block file and acquire more than one to-be-bookkept data set aiming at a block from the block file. Data classes of the one to-be-bookkept data set are different from each other.

The second acquisition module 12 is configured to perform data writing operations in parallel on more than one data storage component according to the more than one to-be-bookkept data set and acquire data storage results respectively corresponding to the more than one data storage component. The number of the data storage components is the same as the number of the to-be-bookkept data sets. A data storage component is used for storing a to-be-bookkept data set of a data class.

The second acquisition module 12 is further configured to, in a case that a data storage failure result exists in the data storage results, acquire a block checkpoint corresponding to the block file and component checkpoints respectively corresponding to the more than one data storage component. The block checkpoint is the maximum block height in the block file. The component checkpoints include the maximum block height respectively corresponding to the more than one data storage component.

The first determining module 13 is configured to determine a data storage component in an abnormal component status in the more than one data storage component according to the block checkpoint and the component checkpoints, and perform a data writing operation on the data storage component in the abnormal component status according to the block file.

For the exemplary function implementations of the first acquisition module 11, the second acquisition module 12 and the first determining module 13, a reference may be made to step S101 to step S104 in the embodiment corresponding to FIG. 2 above.

Refer to FIG. 6 again. The blockchain-based data processing apparatus 1 may further include a second determining module 14 and a third acquisition module 15. The second determining module 14 is configured to determine the data storage component corresponding to a data storage result that is the data storage failure result as a target data storage component. The second determining module 14 is further configured to acquire a target to-be-bookkept data set associated with the target data storage component from the more than one to-be-bookkept data set. The third acquisition module 15 is configured to perform a data writing operation on the target data storage component according to the target to-be-bookkept data set to acquire a data rewriting storage result of the target data storage component. The third acquisition module 15 is further configured to, in a case that the data rewriting storage result is the data storage failure result, statistically collect the number of operations that the data writing operation is performed on the target data storage component. The third acquisition module 15 is further configured to, in a case that the number of operations is less than a number-of-operations threshold, perform a data writing operation on the target data storage component again according to the target to-be-bookkept data set. The third acquisition module 15 is further configured to, in a case that the number of operations is equal to the number-of-operations threshold, notify the second acquisition module 12 to acquire a block checkpoint corresponding to the block file and component checkpoints respectively corresponding to the more than one data storage component. For the exemplary functional implementations of the second determining module 14 and the third acquisition module 15, a reference may be made to step S102 in the embodiment corresponding to FIG. 2 above.

In an embodiment, the second determining module 14 is configured to determine the data storage component corresponding to a data storage result that is the data storage failure result as a target data storage component. The second determining module 14 is further configured to acquire the number of operations that the data writing operation is performed on the target data storage component. The third acquisition module is further configured to, in a case that the number of operations is equal to the number-of-operations threshold, notify the second acquisition module 12 to acquire a block checkpoint corresponding to the block file component checkpoints respectively corresponding to the more than one data storage component.

In an embodiment, the second determining module 14 is further configured to compare the number of operations with the number-of-operation threshold. The third acquisition module 15 is further configured to, in a case that the number of operations is less than the number-of-operations threshold, perform a data writing operation on the target data storage component according to the target to-be-bookkept data set to acquire a data rewriting storage result of the target data storage component. The target to-be-bookkept data set is a to-be-bookkept data set associated with the target data storage component in the more than one to-be-bookkept data set. The third acquisition module 15 is further configured to, in a case that the data rewriting storage result is the data storage failure result, update the number of operations and notify the second determining module 14 to compare the number of operations with the number-of-operations threshold.

Refer to FIG. 6 again. The first determining module 13 may include a first determining unit 131, a second determining unit 132, a first acquisition unit 133, and a first execution unit 134. The first determining unit 131 is configured to determine a component checkpoint less than the block checkpoint in the component checkpoints as a to-be-updated component checkpoint. The first determining unit 131 is further configured to determine a data storage component corresponding to the to-be-updated component checkpoint in the more than one data storage component as a to-be-recovered data storage component. A component status of the to-be-recovered data storage component is the abnormal component status. The second determining unit 132 is configured to determine a to-be-recovered block height interval of the to-be-recovered data storage component according to the to-be-updated component checkpoint and the block checkpoint. The first acquisition unit 133 is configured to acquire a to-be-recovered data set belonging to the to-be-recovered block height interval from the block file. A data class corresponding to the to-be-recovered data set is the same as a data class corresponding to the to-be-recovered data storage component. The first execution unit 134 is configured to perform a data writing operation on the to-be-recovered data storage component according to the to-be-recovered data set. For the exemplary functional implementations of the first determining unit 131, the second determining unit 132, the first acquisition unit 133 and the first execution unit 134, a reference may be made to step S104 in the embodiment corresponding to FIG. 2 above.

Refer to FIG. 6 again. The more than one data storage component includes a first data storage component, and the component checkpoints include a first component checkpoint corresponding to the first data storage component. The blockchain-based data processing apparatus 1 may further include a fourth acquisition module 16 and a third determining module 17. The fourth acquisition module 16 is configured to, in a case that a data reconciliation cycle is reached, acquire a bookkept data set from a cache block file based on the first component checkpoint. The maximum block height corresponding to the bookkept data set is equal to the first component checkpoint. A data class corresponding to the bookkept data set is the same as a data class corresponding to the first data storage component. The cache block file refers to the block file stored in a cache layer; The third determining module 17 is configured to compare data in the first data storage component with data in the bookkept data set to obtain a first comparison result, and determine a component status of the first data storage component according to the first comparison result. The third determining module 17 is further configured to, in a case that the component status of the first data storage component is the abnormal component status, perform a data writing operation on the first data storage component in the abnormal component status according to the block file. For the exemplary function implementations of the fourth acquisition module 16 and the third determining module 17, a reference may be made to step S205 to step S206 in the embodiment corresponding to FIG. 4 above.

Refer to FIG. 6 again. The third determining module 17 may include a second acquisition unit 171 and a first comparison unit 172.

The second acquisition unit 171 is configured to, in a case that the data class corresponding to the first data storage component is a status class, acquire a first version identity aiming at first status data in the first data storage component and acquire a second version identity aiming at the first status data in the bookkept data set. The first comparison unit 172 is configured to compare the first version identity with the second version identity to obtain a status comparison result. The first comparison unit 172 is further configured to, in a case that the status comparison result indicates that the first version identity is different from the second version identity, determine that the component status of the first data storage component is the abnormal component status. For the exemplary functional implementations of the second acquisition unit 171 and the first comparison unit 172, a reference may be made to step S206 in the embodiment corresponding to FIG. 4 above.

Refer to FIG. 6 again. The third determining module 17 may include a third acquisition unit 173 and a second comparison unit 174. The third acquisition unit 173 is configured to, in a case that the data class corresponding to the first data storage component is a block class, acquire a first block identity aiming at first block height in the first data storage component and acquire a second block identity aiming at the first block height in the bookkept data set. The second comparison unit 174 is configured to compare the first block identity with the second block identity to obtain a block comparison result. The second comparison unit 174 is further configured to, in a case that the block comparison result indicates that the first block identity is different from the second block identity, determine that the component status of the first data storage component is the abnormal component status. For the exemplary functional implementations of the third acquisition unit 173 and the second comparison unit 174, a reference may be made to step S206 in the embodiment corresponding to FIG. 4 above.

Refer to FIG. 6 again. The third determining module 17 may include a fourth acquisition unit 175 and a third comparison unit 176. The fourth acquisition unit 175 is configured to, in a case that the data class corresponding to the first data storage component is a read-write class, acquire a first write data identity aiming at second block height in the first data storage component and acquire a second write data identity aiming at the second block height in the bookkept data set. The third comparison unit 176 is configured to compare the first write data identity with the second write data identity to obtain a read-write comparison result. The third comparison unit 176 is further configured to, in a case that the read-write comparison result indicates that the first write data identity is different from the second write data identity, determine that the component status of the first data storage component is the abnormal component status. For the exemplary functional implementations of the fourth acquisition unit 175 and the third comparison unit 176, a reference may be made to step S206 in the embodiment corresponding to FIG. 4 above.

Refer to FIG. 6 again. The blockchain-based data processing apparatus 1 may further include a fifth acquisition module 18 and a fourth determining module 19. The fifth acquisition module 18 is configured to, in a case that a data reconciliation cycle is reached, transmit a data reconciliation request for requesting ledger data reconciliation to a consensus network. The data reconciliation request carries the component checkpoints. The fifth acquisition module 18 is further configured to acquire to-be-reconciled data sets respectively corresponding to the component checkpoints returned by consensus nodes in the consensus network. A data class corresponding to a component checkpoint is the same as a data class corresponding to a to-be-reconciled data set. The more than one data storage component includes a second data storage component. The to-be-reconciled data sets include a target to-be-reconciled data set. A data class corresponding to the second data storage component is the same as a data class corresponding to the target to-be-reconciled data set. The fourth determining module 19 is configured to compare data in the target to-be-reconciled data set with data in the second data storage component to obtain a second comparison result, and determine a component status of the second data storage component according to the second comparison result. The fourth determining module 19 is further configured to, in a case that the component status of the second data storage component is the abnormal component status, perform a data writing operation on the second data storage component in the abnormal component status according to the block file. For the exemplary function implementations of the fifth acquisition module 18 and the fourth determining module 19, a reference may be made to step S207 in the embodiment corresponding to FIG. 4 above.

Refer to FIG. 6 again, the fourth determining module 19 is further configured to, in a case that the component status of the second data storage component is the abnormal component status and to-be-recovered data of the second data storage component exist in the block file, perform a data writing operation on the second data storage component in the abnormal component status according to the to-be-recovered data. The fourth determining module 19 is further configured to, in a case that the component status of the second data storage component is the abnormal component status and no to-be-recovered data exist in the block file, transmit a data recovery request for requesting ledger data recovery to the consensus network. The data recovery request carries a data identity of the to-be-recovered data. The fourth determining module 19 is further configured to, acquire the to-be-recovered data of the second data storage component returned by the consensus nodes in the consensus network, and perform the data writing operation on the second data storage component in the abnormal component status according to the to-be-recovered data of the second data storage component. For the exemplary function implementation of the fourth determining module 19, a reference may be made to step S207 in the embodiment corresponding to FIG. 4 above.

Refer to FIG. 6 again. The fourth determining module 19 may include a fifth acquisition unit 191 and a fourth comparison unit 192. The fifth acquisition unit 191 is configured to, in a case that the data class corresponding to the second data storage component is a status class, acquire a third version identity aiming at second status data in the second data storage component and acquire a fourth version identity aiming at the second status data in the target to-be-reconciled data set. The fourth comparison unit 192 is configured to compare the third version identity with the fourth version identity to obtain a second comparison result. The fourth comparison unit 192 is further configured to, in a case that the second comparison result indicates that the third version identity is less than the fourth version identity, determine that the component status of the second data storage component is the abnormal component status. For the exemplary functional implementations of the fifth acquisition unit 191 and the fourth comparison unit 192, a reference may be made to step S207 in the embodiment corresponding to FIG. 4 above.

Refer to FIG. 6 again. The fourth determining module 19 may include a sixth acquisition unit 193 and a fifth comparison unit 194. The sixth acquisition unit 193 is configured to, in a case that the data class corresponding to the second data storage component is a block class, acquire a third block identity aiming at third block data in the second data storage component and acquire a fourth block identity aiming at the third block data in the target to-be-reconciled data set. The fifth comparison unit 194 is configured to compare the third block identity with the fourth block identity to obtain a second comparison result. The fifth comparison unit 194 is further configured to, in a case that the second comparison result indicates that the third block identity is less than the fourth block identity, determine that the component status of the second data storage component is the abnormal component status. For the exemplary functional implementations of the sixth acquisition unit 193 and the fifth comparison unit 194, a reference may be made to step S207 in the embodiment corresponding to FIG. 4 above.

Refer to FIG. 6 again. The fourth determining module 19 may include a seventh acquisition unit 195 and a sixth comparison unit 196. The seventh acquisition unit 195 is configured to, in a case that the data class corresponding to the second data storage component is a read-write class, acquire a third write data identity aiming at fourth block height in the second data storage component and acquire a fourth write data identity aiming at the fourth block height in the target to-be-reconciled data set. The sixth comparison unit 196 is configured to compare the third write data identity with the fourth write data identity to obtain a second comparison result. The sixth comparison unit 196 is further configured to, in a case that the second comparison result indicates that the third write data identity is less than the fourth write data identity, determine that the component status of the second data storage component is the abnormal component status. For the exemplary functional implementations of the seventh acquisition unit 195 and the sixth comparison unit 196, a reference may be made to step S207 in the embodiment corresponding to FIG. 4 above.

Refer to FIG. 6 again. The data classes include a block class, a status class and a read-write class. The first acquisition module 11 may include a first generation unit 111, a second generation unit 112, a third generation unit 113 and a fourth generation unit 114. The first generation unit 111 is configured to acquire block data associated with the block class from the block file, and generate a block data set according to the block data. The second generation unit 112 is configured to acquire status data associated with the status class from the block file, and generate a status data set according to the status data. The third generation unit 113 is configured to acquire read-write data associated with the read-write class from the block file, and generate a read-write data set according to the read-write data. The fourth generation unit 114 is configured to generate more than one to-be-bookkept data sets according to the block data set, the status data set and the read-write data set. For the exemplary functional implementations of the first generation unit 111, the second generation unit 112, the third generation unit 113 and the fourth generation unit 114, a reference may be made to step S101 in the embodiment corresponding to FIG. 2 above.

Refer to FIG. 6 again. The block data include transaction information and block information. The block information includes a transaction identity of the transaction information. The first generation unit 111 may include a first determining subunit 1111 and the second generation subunit 1112. The first determining subunit 1111 is configured to use the transaction identity as a first index key, use the transaction information as a first index value, and determine the first index key and the first index value as a first index pair. The first determining subunit 1111 is further configured to use the block height corresponding to the block information as a second index key, use the block information as a second index value, and determine the second index key and the second index value as a second index pair. The first determining subunit 1111 is further configured to use a block identity corresponding to the block information as a third index key, use the block height corresponding to the block information as a third index value, and determine the third index key and the third index value as a third index pair. The first generation subunit 1112 is configured to generate a block data set according to the first index pair, the second index pair and the third index pair. For the exemplary functional implementations of the first determining subunit 1111 and the first generation subunit 1112, a reference may be made to step S101 in the embodiment corresponding to FIG. 2 above.

Refer to FIG. 6 again. The second generation unit 112 may include a second determining subunit 1121 and a second generation subunit 1122. The second determining subunit 1121 is configured to combine a contract identity and an object identity to form a fourth index key, use the status data as a fourth index value, and determine the fourth index key and the fourth index value as a fourth index pair. The second determining subunit 1121 is further configured to acquire a version identity corresponding to historical status data of the object identity, and generate a version identity corresponding to the status data according to the version identity corresponding to the historical status data. The second determining subunit 1121 is further configured to use the status data and the version identity corresponding to the status data as a fifth index key, use the block height corresponding to the status data as a fifth index value, and determine the fifth index key and the fifth index value as a fifth index pair. The second generation subunit 1122 is configured to generate a status data set according to the fourth index pair and the fifth index pair. For the exemplary functional implementations of the second determining subunit 1121 and the second generation subunit 1122, a reference may be made to step S101 in the embodiment corresponding to FIG. 2 above.

Refer to FIG. 6 again. The read-write data include read data and write data. The third generation unit 113 may include a third determining subunit 1131 and a third generation subunit 1132. The third determining subunit 1131 is configured to use a read data identity of the read data as a sixth index key, use the read data as a sixth index value, and determine the sixth index key and the sixth index value as a sixth index pair. The third determining subunit 1131 is further configured to use a write data identity of the write data as a seventh index key, use the write data as a seventh index value, and determine the seventh index key and the seventh index value as a seventh index pair. The third determining subunit 1131 is further configured to use the block height corresponding to the read data as an eighth index key, use the read data identity as an eighth index value, and determine the eighth index key and the eighth index value as an eighth index pair. The third determining subunit 1131 is further configured to use the block height corresponding to the write data as a ninth index key, use the write data identity as a ninth index value, and determine the ninth index key and the ninth index value as a ninth index pair. The third generation subunit 1132 is configured to generate a read-write data set according to the sixth index pair, the seventh index pair, the eighth index pair and the ninth index pair. For the exemplary functional implementations of the third determining subunit 1131 and the third generation subunit 1132, a reference may be made to step S101 in the embodiment corresponding to FIG. 2 above.

Refer to FIG. 6 again. The more than one to-be-bookkept data set includes a batch to-be-bookkept data set. The more than one data storage component includes a batch data storage component used for storing the batch to-be-bookkept data set. The first acquisition module 11 may include an eighth acquisition unit 115 and a second execution unit 116. The eighth acquisition unit 115 is configured to acquire a batch data writing instruction aiming at the batch to-be-bookkept data set. The second execution unit 116 is configured to perform a data writing operation on the batch data storage component according to the batch data writing instruction to write the batch to-be-bookkept data set to the batch data storage component. The second execution unit 116 is further configured to perform data writing operations on other data storage components in parallel according to other to-be-bookkept data sets while performing the data writing operation on the batch data storage component. The other to-be-bookkept data sets include to-be-bookkept data sets except the batch to-be-bookkept data set in the more than one to-be-bookkept data set. The other data storage components include data storage components except the batch data storage component in the more than one data storage component. For the exemplary functional implementations of the eighth acquisition unit 115 and the second execution unit 116, a reference may be made to step S102 in the embodiment corresponding to FIG. 2 above.

Figure 7:
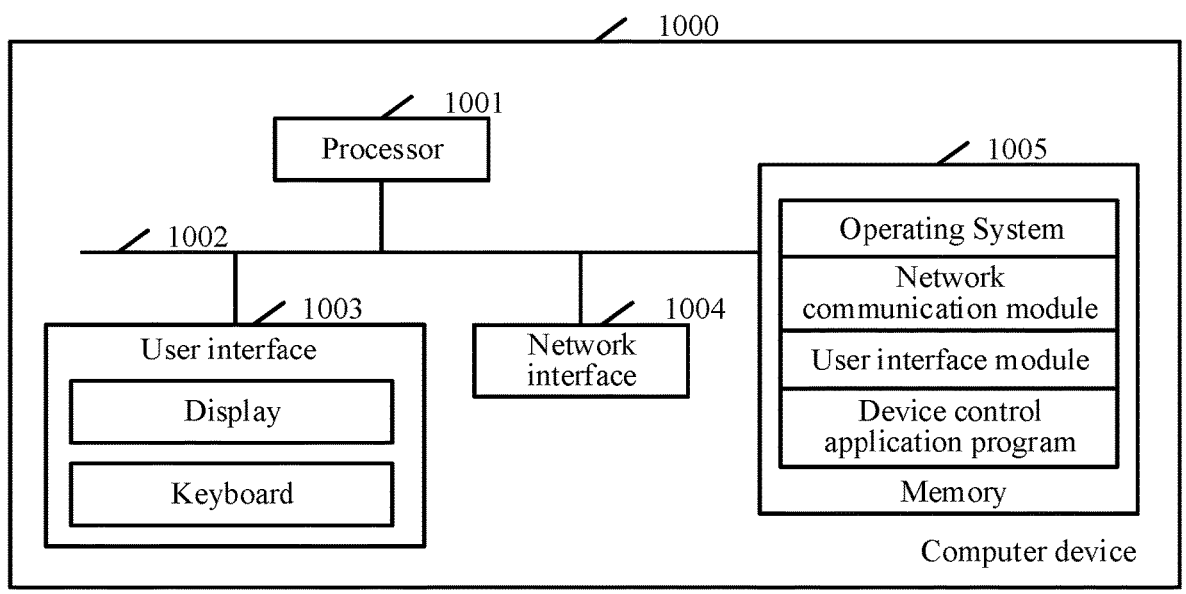
FIG. 7 is a schematic structural diagram of a computer device according to an embodiment of this disclosure.

Further, refer to FIG. 7, which is a schematic structural diagram of a computer device according to an embodiment of this disclosure. Referring to FIG. 7, the computer device 1000 may be the consensus node in the embodiment corresponding to FIG. 2. The computer device 1000 may include at least one processor 1001, for example, a CPU, at least one network interface 1004, a user interface 1003, a memory 1005, and at least one communication bus 1002. The communication bus 1002 is configured to implement connection and communication between the components. The user interface 1003 may include a display and a keyboard. In an embodiment, the network interface 1004 may include a standard wired interface and a wireless interface (such as WI-FI interface). The memory 1005 may be a high-speed RAM memory, or a non-volatile memory, for example, at least one magnetic disk memory. In an embodiment, the memory 1005 may be at least one storage apparatus located remotely from the foregoing processor 1001. Referring to FIG. 7, the memory 1005 used as a computer storage medium may include an operating system, a network communication module, a user interface module, and a device control application program. In the computer device 1000 illustrated in FIG. 7, the network interface 1004 can provide a network communication function. The user interface 1003 is mainly configured to provide an input interface for the user. Processing circuitry, such as the processor 1001, may be configured to call the device control application program stored in the memory 1005 to implement the blockchain-based data processing method described above. It is to be understood that the computer device 1000 described in the embodiment of this disclosure can execute the description of the blockchain-based data processing method in the embodiment corresponding to FIG. 2 and FIG. 4 above, and can also execute the description of the data processing apparatus 1 in the embodiment corresponding to FIG. 6 above. In addition, for examples of the beneficial effects of the same method, refer to the description above.

This disclosure provides a computer device, including: one or more processors, a memory and a network interface. The one or more processors are connected to the memory and the network interface. The network interface is configured to provide a data communication function. The memory is configured to store computer-readable instructions. The one or more processors are configured to call the computer-readable instructions to enable the computer device to execute the method according to the embodiment of this disclosure.

An embodiment of this disclosure further provides one or more non-volatile computer-readable storage medium storing computer-readable instructions. The computer-readable storage medium stores the computer-readable instructions. The computer-readable instructions, when executed by one or more processors, implement the blockchain-based data processing methods corresponding to the steps in FIG. 2 and FIG. 4. For details, refer to the implementations corresponding to the steps in FIG. 2 and FIG. 4. The computer-readable storage medium may be the blockchain-based data processing apparatus according to any one of the embodiments or an internal storage unit of the computer device, such as a hard disk or an internal memory of the computer device. The computer-readable storage medium may also be an external storage device of the computer device, such as a plug-in hard disk, a Smart Media Card (SMC), a Secure Digital (SD) card or a flash card equipped on the computer device. Further, the computer-readable storage medium may also include both the internal storage unit and the external storage device of the computer device. The computer-readable storage medium is used for storing the computer program and other programs and data required by the computer device. The computer-readable storage medium may also be used for temporarily storing data that have been output or will be output.

An embodiment of this disclosure further provides a computer program product or a computer program. The computer program product or the computer program includes computer-readable instructions. The computer-readable instructions are stored in a computer-readable storage medium. The processor of the computer device reads the computer-readable instructions from the computer-readable storage medium and the processor executes the computer-readable instructions to enable the computer device to execute the description of the blockchain-based data processing methods in the embodiments corresponding to FIG. 2 and FIG. 4 above.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Terms such as "first" and "second" in the description, claims and accompanying drawings of this disclosure are used for distinguishing different objects, instead of describing a specific order. In addition, the terms "include" and any variant thereof are intended to cover a non-exclusive inclusion. For example, a process, method, apparatus, product, or device that includes a series of steps or units is not limited to the listed steps or units; and instead, further can include a step or unit that is not listed, or further can include another step or unit that is intrinsic to the process, method, apparatus, product, or device. Units and algorithm steps of the examples described in the foregoing disclosed embodiments may be implemented by electronic hardware, computer software, or a combination thereof. To clearly describe the interchangeability between the hardware and the software, the foregoing has generally described compositions and steps of each example based on functions. Whether the functions are executed through hardware or software depends on particular applications and design constraint conditions of the technical solutions. Different methods may be used to implement the described functions for each particular application, which are within the scope of this disclosure.

The methods and related apparatuses according to the embodiments of this disclosure are described with reference to the method flowcharts and/or schematic structural diagrams according to the embodiments of this disclosure. For example, each process and/or block in the method flowcharts and/or schematic structural diagrams and the combination of process and/or block in the flowcharts and/or block diagrams can be implemented by computer program instructions. These computer program instructions can be provided to the processors of general-purpose computers, special-purpose computers, embedded processing units or other programmable data processing devices to generate a machine, so that the instructions executed by the processors of computers or other programmable data processing devices generate apparatuses for implementing the functions specified in one or more processes of the flowcharts and/or one or more blocks of the schematic structural diagrams.

These computer program instructions may also be stored in a computer-readable memory that can guide a computer or other programmable data processing devices to work in a specific way, so that the instructions stored in the computer-readable memory generate a manufacturing product including an instruction apparatus, which implements the functions specified in one or more processes of the flowcharts and/or one or more blocks of the schematic structural diagrams. These computer program instructions may also be loaded onto a computer or other programmable data processing devices to enable a series of operation steps to be executed on the computer or other programmable devices to generate processing implemented by the computer, so that the instructions executed on the computer or other programmable devices provide steps for implementing the functions specified in one or more processes of the flowcharts and/or one or more blocks of the schematic structural diagrams. What are disclosed above are merely exemplary embodiments of this disclosure, and are not intended to limit the scope of the claims of this disclosure. Therefore, equivalent variations and other embodiments shall still fall within the scope of this disclosure.

What is claimed is:

1. A method of blockchain-based data processing, comprising:
    acquiring a plurality of to-be-bookkept data sets associated with one or more blocks from a block file, each of the plurality of to-be-bookkept data sets having a respective data class;
    performing data writing operations in parallel on a plurality of data storage components according to the plurality of to-be-bookkept data sets and acquiring a data storage result corresponding to each of the plurality of data storage components, a number of the plurality of data storage components being equal to a number of the plurality of to-be-bookkept data sets, each of the plurality of data storage components being configured to store a respective one of the plurality of to-be-bookkept data sets;
    based on a data storage failure result being included in the data storage results, acquiring a block checkpoint corresponding to the block file and a component checkpoint corresponding to each of the plurality of data storage components, the block checkpoint being a maximum block height in the block file, each of the component checkpoints indicating a maximum block height corresponding to a respective one of the plurality of data storage components;
    determining a data storage component of the plurality of data storage components that is in an abnormal component status according to the block checkpoint and the component checkpoints; and
    performing a data writing operation on the data storage component in the abnormal component status according to the block file.

2. The method according to claim 1, wherein the acquiring the block checkpoint comprises:
    determining a data storage component of the plurality of data storage components corresponding to the data storage failure result as a target data storage component;
    acquiring a target to-be-bookkept data set associated with the target data storage component from the plurality of to-be-bookkept data sets;
    performing a data writing operation on the target data storage component according to the target to-be-bookkept data set to acquire a data rewriting storage result of the target data storage component;
    based on the data rewriting storage result being the data storage failure result, counting a number of operations that the data writing operation has been performed on the target data storage component;
    based on the number of operations being less than a number-of-operations threshold, performing another data writing operation on the target data storage component according to the target to-be-bookkept data set; and
    based on the number of operations being equal to the number-of-operations threshold, acquiring the block checkpoint corresponding to the block file and the component checkpoint corresponding to each of the plurality of data storage components.

3. The method according to claim 1, wherein the acquiring the block checkpoint comprises:
    determining a data storage component of the plurality of data storage components corresponding to the data storage failure result as a target data storage component;
    counting a number of operations that a data writing operation has been performed on the target data storage component; and
    based on the number of operations being equal to a number-of-operations threshold, acquiring the block checkpoint corresponding to the block file and the component checkpoint corresponding to each of the plurality of data storage components.

4. The method according to claim 3, further comprising:
    based on the number of operations being less than the number-of-operations threshold, performing the data writing operation on the target data storage component according to the target to-be-bookkept data set to acquire a data rewriting storage result of the target data storage component, the target to-be-bookkept data set being associated with the target data storage component in the plurality of to-be-bookkept data sets; and
    based on the data rewriting storage result being the data storage failure result, updating the number of operations and comparing the updated number of operations with the number-of-operations threshold.

5. The method according to claim 1, wherein the determining the data storage component comprises:
    determining a component checkpoint of the component checkpoints that is less than the block checkpoint as a to-be-updated component checkpoint;
    determining the data storage component of the plurality of data storage components that corresponds to the to-be-updated component checkpoint as a to-be-recovered data storage component, a component status of the to-be-recovered data storage component being the abnormal component status;
    determining a to-be-recovered block height interval of the to-be-recovered data storage component according to the to-be-updated component checkpoint and the block checkpoint;
    acquiring a to-be-recovered data set associated with the to-be-recovered block height interval from the block file, a data class corresponding to the to-be-recovered data set being a data class corresponding to the to-be-recovered data storage component; and
    performing the data writing operation on the to-be-recovered data storage component according to the to-be-recovered data set.

6. The method according to claim 1, wherein:
the plurality of data storage components includes a first data storage component, and the component checkpoints include a first component checkpoint corresponding to the first data storage component; and
the method further includes:
based on a data reconciliation cycle being reached, acquiring a bookkept data set from a cache block file based on the first component checkpoint, a maximum block height corresponding to the bookkept data set being equal to the first component checkpoint, a data class corresponding to the bookkept data set being a data class corresponding to the first data storage component, the cache block file indicating a block file stored in a cache layer,
comparing data in the first data storage component with data in the bookkept data set to obtain a first comparison result,
determining a component status of the first data storage component according to the first comparison result, and
based on the component status of the first data storage component being the abnormal component status, performing a data writing operation on the first data storage component in the abnormal component status according to the block file.

7. The method according to claim 6, wherein the comparing the data in the first data storage component with the data in the bookkept data set includes:
based on the data class corresponding to the first data storage component being a status class, acquiring a first version identity of first status data associated with the first data storage component and acquiring a second version identity of the first status data associated with the bookkept data set, and
comparing the first version identity with the second version identity to obtain a status comparison result; and
the determining the component status includes:
determining that the component status of the first data storage component is the abnormal component status based on the status comparison result indicating that the first version identity is different from the second version identity.

8. The method according to claim 6, wherein:
the comparing the data in the first data storage component with the data in the bookkept data set includes at least one of:
based on the data class corresponding to the first data storage component being a block class,
acquiring a first block identity of a first block height associated with the first data storage component and acquiring a second block identity of the first block height associated with the bookkept data set,
comparing the first block identity with the second block identity to obtain a block comparison result, and
based on the block comparison result indicating that the first block identity is different from the second block identity, determining that the component status of the first data storage component is the abnormal component status; or
based on the data class corresponding to the first data storage component being a read-write class,
acquiring a first write data identity of a second block height associated with the first data storage component and acquiring a second write data identity of the second block height associated with the bookkept data set,
comparing the first write data identity with the second write data identity to obtain a read-write comparison result, and
based on the read-write comparison result indicating that the first write data identity is different from the second write data identity, determining that the component status of the first data storage component is the abnormal component status.

9. The method according to claim 1, further comprising:
based on a data reconciliation cycle being reached, transmitting a data reconciliation request for requesting a ledger data reconciliation to a consensus network, the data reconciliation request including the component checkpoints;
acquiring to-be-reconciled data sets corresponding to the component checkpoints from consensus nodes in the consensus network, each of the component checkpoints having a same data class as a corresponding one of the to-be-reconciled data sets, the plurality of data storage components including a second data storage component, the to-be-reconciled data sets including a target to-be-reconciled data set, the second data storage component having a same data class as the target to-be-reconciled data set;
comparing data in the target to-be-reconciled data set with data in the second data storage component to obtain a second comparison result;
determining a component status of the second data storage component according to the second comparison result; and
based on the component status of the second data storage component being the abnormal component status, performing a data writing operation on the second data storage component in the abnormal component status according to the block file.

10. The method according to claim 9, wherein:
the performing the data writing operation on the second data storage component includes performing the data writing operation on the second data storage component in the abnormal component status according to to-be-recovered data of the second data storage component based on the component status of the second data storage component being the abnormal component status and the to-be-recovered data of the second data storage component being included in the block file; and
the method further includes:
based on the component status of the second data storage component being the abnormal component status and the to-be-recovered data not being included in the block file, transmitting a data recovery request to the consensus network to recover the ledger data, the data recovery request including a data identity of the to-be-recovered data,
acquiring the to-be-recovered data of the second data storage component provided by the consensus nodes in the consensus network, and
performing the data writing operation on the second data storage component in the abnormal component status according to the to-be-recovered data of the second data storage component.

11. The method according to claim 9, wherein:
the comparing the data in the target to-be-reconciled data set with the data in the second data storage component includes:
based on the data class corresponding to the second data storage component being a status class, acquiring a third version identity of second status data associated with the second data storage component and acquiring a fourth version identity of the second status data associated with the target to-be-reconciled data set;

comparing the third version identity with the fourth version identity to obtain a second comparison result; and based on the second comparison result indicating that the third version identity is less than the fourth version identity, determining that the component status of the second data storage component is the abnormal component status.

12. The method according to claim 1, wherein:

the data classes include a block class, a status class, and a read-write class; and the acquiring the plurality of to-be-bookkept data sets associated with the one or more blocks from the block file includes:

acquiring block data associated with the block class from the block file, and generating a block data set according to the block data, acquiring status data associated with the status class from the block file, and generating a status data set according to the status data, acquiring read-write data associated with the read-write class from the block file, and generating a read-write data set according to the read-write data, and generating the plurality of to-be-bookkept data sets according to the block data set, the status data set, and the read-write data set.

13. The method according to claim 12, wherein:

the block data includes transaction information and block information, and the block information includes a transaction identity of the transaction information; and the generating the block data set according to the block data further includes:

setting the transaction identity as a first index key, setting the transaction information as a first index value, and setting the first index key and the first index value as a first index pair, setting a block height corresponding to the block information as a second index key, setting the block information as a second index value, and setting the second index key and the second index value as a second index pair, setting a block identity corresponding to the block information as a third index key, setting the block height corresponding to the block information as a third index value, and setting the third index key and the third index value as a third index pair, and generating the block data set according to the first index pair, the second index pair, and the third index pair.

14. The method according to claim 12, wherein the generating the status data set according to the status data comprises:

combining a program identity of a program associated with the plurality of to-be-bookkept data sets and an object identity of an object associated with the program to form a fourth index key, setting the status data as a fourth index value, and setting the fourth index key and the fourth index value as a fourth index pair;

acquiring a version identity corresponding to historical status data of the object identity, and generating a version identity corresponding to the status data according to the version identity corresponding to the historical status data;

setting the status data and the version identity corresponding to the status data as a fifth index key, setting the block height corresponding to the status data as a fifth index value, and setting the fifth index key and the fifth index value as a fifth index pair; and generating the status data set according to the fourth index pair and the fifth index pair.

15. The method according to claim 12, wherein:

the read-write data includes read data and write data; and the generating the read-write data set according to the read-write data includes:

setting a read data identity of the read data as a sixth index key, setting the read data as a sixth index value, and setting the sixth index key and the sixth index value as a sixth index pair, setting a write data identity of the write data as a seventh index key, setting the write data as a seventh index value, and setting the seventh index key and the seventh index value as a seventh index pair, setting a block height corresponding to the read data as an eighth index key, setting the read data identity as an eighth index value, and setting the eighth index key and the eighth index value as an eighth index pair, setting the block height corresponding to the write data as a ninth index key, setting the write data identity as a ninth index value, and setting the ninth index key and the ninth index value as a ninth index pair, and generating the read-write data set according to the sixth index pair, the seventh index pair, the eighth index pair, and the ninth index pair.

16. The method according to claim 1, wherein:

the plurality of to-be-bookkept data sets includes a first batch to-be-bookkept data set, and the plurality of data storage components includes a first batch data storage component configured to store the first batch to-be-bookkept data set; and the performing the data writing operations in parallel on the plurality of data storage components includes:

acquiring a batch data writing instruction associated with the first batch to-be-bookkept data set, and performing a first data writing operation of the data writing operations on the first batch data storage component according to the batch data writing instruction to write the first batch to-be-bookkept data set to the first batch data storage component.

17. An apparatus for processing blockchain-based data, comprising:

processing circuitry configured to:

acquire a plurality of to-be-bookkept data sets associated with one or more blocks from a block file, each of the plurality of to-be-bookkept data sets having a respective data class;

perform data writing operations in parallel on a plurality of data storage components according to the plurality of to-be-bookkept data sets and acquire a data storage result corresponding to each of the plurality of data storage components, a number of the plurality of data storage components being equal to a number of the plurality of to-be-bookkept data sets, each of the plurality of data storage components being configured to store a respective one of the plurality of to-be-bookkept data sets;

based on a data storage failure result being included in the data storage results, acquire a block checkpoint corresponding to the block file and a component checkpoint corresponding to each of the plurality of data storage components, the block checkpoint being a maximum block height in the block file, each of the component checkpoints indicating a maximum block height corresponding to a respective one of the plurality of data storage components;

determine a data storage component of the plurality of data storage components that is in an abnormal component status according to the block checkpoint and the component checkpoints; and perform a data writing operation on the data storage component in the abnormal component status according to the block file.

18. The apparatus according to claim 17, wherein the processing circuitry is configured to:

determine a data storage component of the plurality of data storage components corresponding to the data storage failure result as a target data storage component;

acquire a target to-be-bookkept data set associated with the target data storage component from the plurality of to-be-bookkept data sets;

perform a data writing operation on the target data storage component according to the target to-be-bookkept data set to acquire a data rewriting storage result of the target data storage component;

based on the data rewriting storage result being the data storage failure result, count a number of operations that the data writing operation has been performed on the target data storage component;

based on the number of operations being less than a number-of-operations threshold, perform another data writing operation on the target data storage component according to the target to-be-bookkept data set; and based on the number of operations being equal to the number-of-operations threshold, acquire the block checkpoint corresponding to the block file and the component checkpoint corresponding to each of the plurality of data storage components.

19. The apparatus according to claim 17, wherein the processing circuitry is configured to:

determine a data storage component of the plurality of data storage components corresponding to the data storage failure result as a target data storage component;

count a number of operations that a data writing operation has been performed on the target data storage component; and based on the number of operations being equal to a number-of-operations threshold, acquire the block checkpoint corresponding to the block file and the component checkpoint corresponding to each of the plurality of data storage components.

20. A non-transitory computer readable storage medium storing instructions which when executed by at least one processor cause the at least one processor to perform:

acquiring a plurality of to-be-bookkept data sets associated with one or more blocks from a block file, each of the plurality of to-be-bookkept data sets having a respective data class;

performing data writing operations in parallel on a plurality of data storage components according to the plurality of to-be-bookkept data sets and acquiring a data storage result corresponding to each of the plurality of data storage components, a number of the plurality of data storage components being equal to a number of the plurality of to-be-bookkept data sets, each of the plurality of data storage components being configured to store a respective one of the plurality of to-be-bookkept data sets;

based on a data storage failure result being included in the data storage results, acquiring a block checkpoint corresponding to the block file and a component checkpoint corresponding to each of the plurality of data storage components, the block checkpoint being a maximum block height in the block file, each of the component checkpoints indicating a maximum block height corresponding to a respective one of the plurality of data storage components;

determining a data storage component of the plurality of data storage components that is in an abnormal component status according to the block checkpoint and the component checkpoints; and performing a data writing operation on the data storage component in the abnormal component status according to the block file.

* * * * *